United States Patent
Her et al.

(10) Patent No.: US 9,483,132 B2
(45) Date of Patent: Nov. 1, 2016

(54) TOUCH WINDOW AND DISPLAY INCLUDING THE SAME

(71) Applicant: LG INNOTEK CO., LTD., Seoul (KR)

(72) Inventors: Jae Hak Her, Seoul (KR); Mun Suk Kang, Seoul (KR); Do Youb Kwon, Seoul (KR); Ji Chang Ryu, Seoul (KR); Soung Kyu Park, Seoul (KR); Seok Pyo Yun, Seoul (KR); Gyu Rin Lee, Seoul (KR); Jin Seok Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 54 days.

(21) Appl. No.: 14/483,722

(22) Filed: Sep. 11, 2014

(65) Prior Publication Data
US 2015/0070312 A1    Mar. 12, 2015

(30) Foreign Application Priority Data

Sep. 11, 2013 (KR) .................. 10-2013-0109176
Oct. 22, 2013 (KR) .................. 10-2013-0126176
Jan. 23, 2014 (KR) .................. 10-2014-0008165

(51) Int. Cl.
*G06F 3/041*   (2006.01)

(52) U.S. Cl.
CPC ................................ *G06F 3/041* (2013.01)

(58) Field of Classification Search
None
See application file for complete search history.

(56) References Cited

U.S. PATENT DOCUMENTS

| | | | | |
|---|---|---|---|---|
| 9,152,289 B2* | 10/2015 | Nishikawa | ............. | G06F 3/045 |
| 2013/0002133 A1* | 1/2013 | Jin | ........................ | G06F 1/1626 |
| | | | | 313/511 |
| 2013/0300678 A1* | 11/2013 | Kang | ..................... | G06F 3/044 |
| | | | | 345/173 |
| 2014/0071065 A1* | 3/2014 | Kung | ..................... | G06F 3/041 |
| | | | | 345/173 |
| 2014/0152608 A1* | 6/2014 | Peng | ................... | G01D 5/2405 |
| | | | | 345/174 |

FOREIGN PATENT DOCUMENTS

| | | |
|---|---|---|
| KR | 10-2013-0003215 A | 1/2013 |
| KR | 10-2013-0003856 A | 1/2013 |
| KR | 10-2013-0061156 A | 6/2013 |
| KR | 10-2013-0083628 A | 7/2013 |

* cited by examiner

*Primary Examiner* — Viet Pham
*Assistant Examiner* — Christopher Kohlman
(74) *Attorney, Agent, or Firm* — KED & Associates, LLP

(57) ABSTRACT

A touch window includes a substrate in which first and second active areas are defined. A first sensing electrode is provided on the first active area to sense a position, and a second sensing electrode is provided in the second active area to sense a position. The first sensing electrode includes a material different from a material constituting the second sensing electrode.

21 Claims, 35 Drawing Sheets

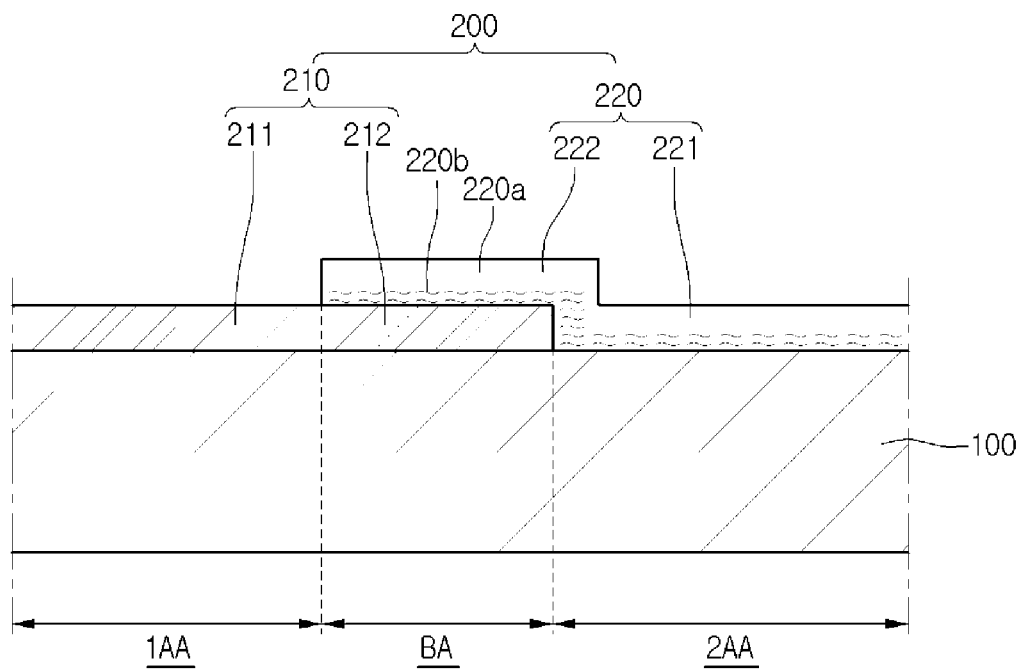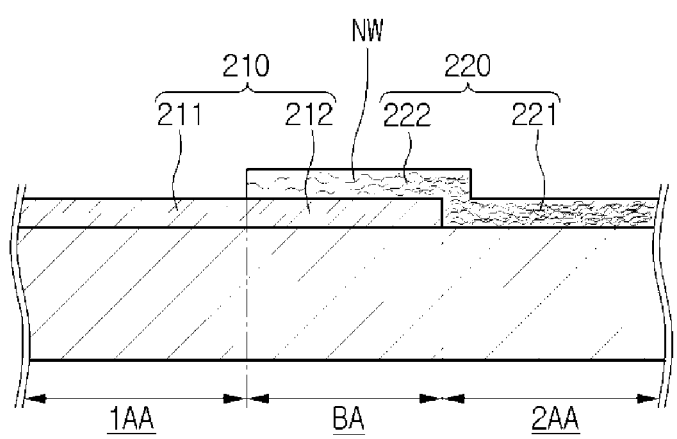

TOUCH WINDOW AND DISPLAY INCLUDING THE SAME

CROSS-REFERENCE TO RELATED APPLICATIONS

This application claims priority under 35 U.S.C. §119 to Korean Application Nos. 10-2013-0109176 filed on Sep. 11, 2013, 10-2013-0126176 filed on Oct. 22, 2013 and 10-2014-0008165 filed Jan. 23, 2014, whose entire disclosures are hereby incorporated by reference.

BACKGROUND

1. Field

The disclosure relates to a touch window and a display including the same.

2. Background

A touch panel, which performs an input function through the touch to an image displayed on a display by an input device such as a stylus pen or a finger, has been applied to various electronic appliances. The touch panel may be typically classified into a resistive touch panel and a capacitive touch panel.

In the resistive touch panel, the position of the touch point is detected by detecting the variation of resistance according to the connection between electrodes when pressure is applied to an input device. In the capacitive touch panel, the position of the touch point is detected by detecting the variation of capacitance when a finger of the user is touched on the capacitive touch panel between electrodes.

When taking into consideration the convenience of a fabrication scheme and a sensing power, the capacitive touch panel has been spotlighted in a smaller model touch panel. Further, a demand for a flexible or bendable touch panel has increased due to increased user experience.

BRIEF DESCRIPTION OF THE DRAWINGS

The embodiments will be described in detail with reference to the following drawings in which like reference numerals refer to like elements wherein:

FIGS. 12 to 16 are sectional views showing a touch window according to various embodiments.

DETAILED DESCRIPTION OF THE EMBODIMENTS

Figure 1:
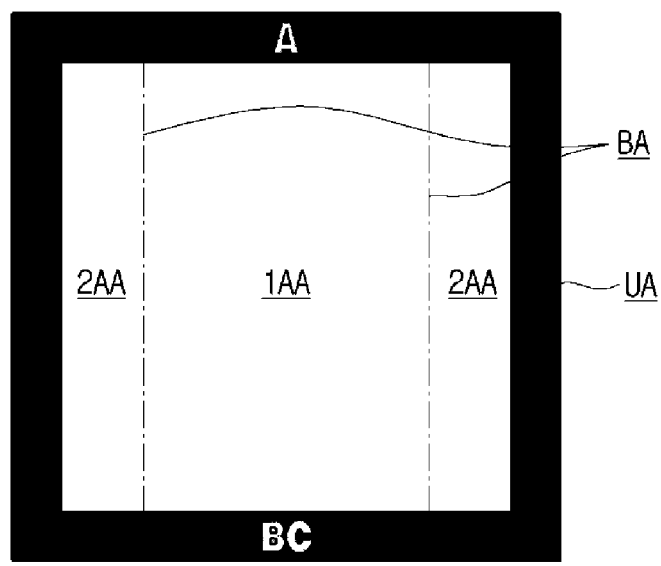
FIG. 1 is a plan view schematically showing a touch window according to the embodiment.
Figure 2:
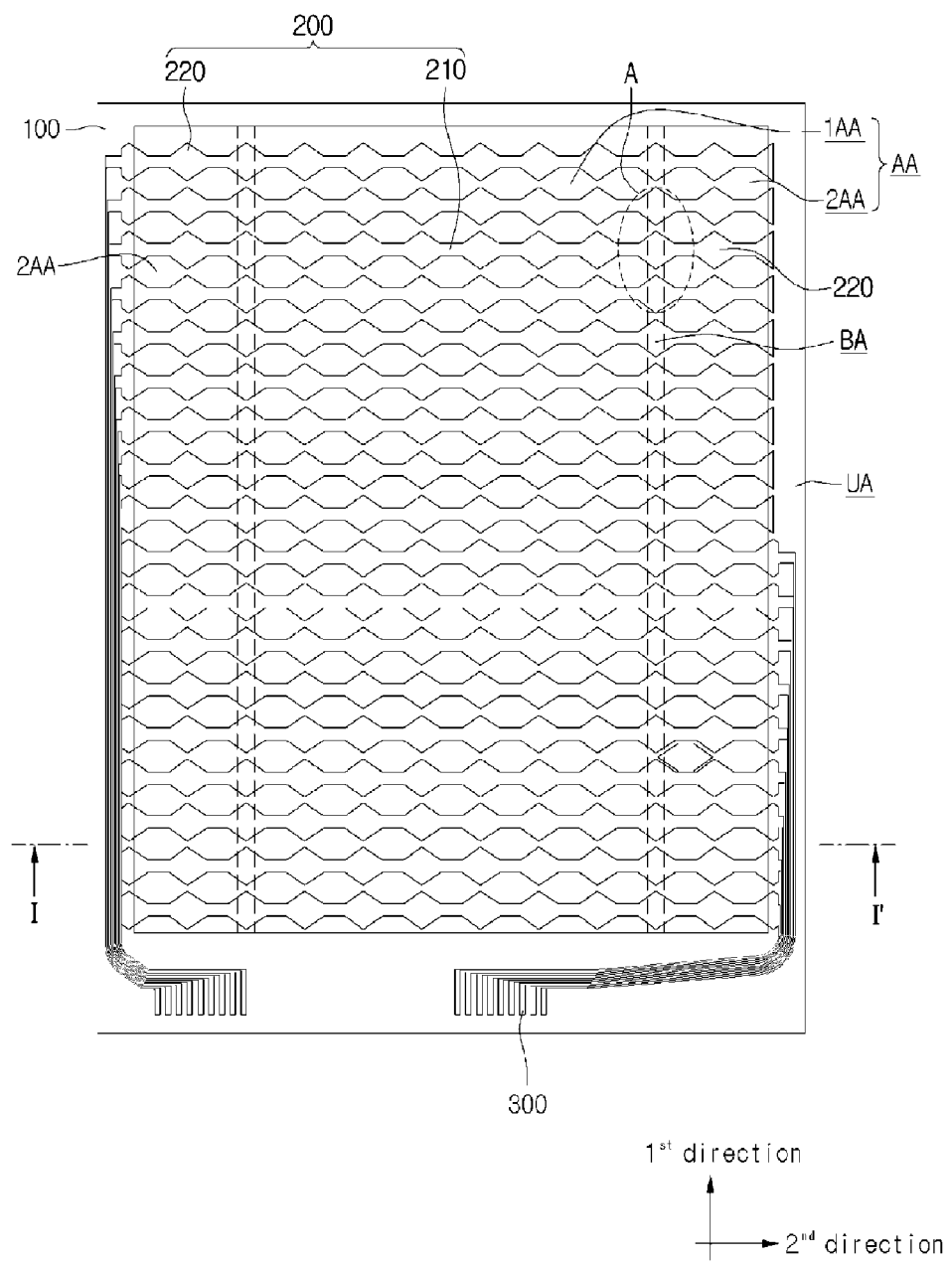
FIG. 2 is a plan view showing the touch window according to the embodiment.

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings Referring to FIGS. 1 to 4, a touch window 10 includes a substrate 100 having an active area AA, in which a position of an input device (e.g., finger) is sensed, and an unactive or inactive area UA provided at a peripheral portion of the active area AA In this case, a sensing electrode 200 may be formed in the active area AA such that the input device may be sensed. Wires 300 electrically connecting the sensing electrodes 200 to each other may be formed in the unactive area UA. In addition, an external circuit connected to the wires 300 may be placed in the unactive area UA.

Referring to FIG. 1, the unactive area UA may surround the active area AA. The active area AA may include four lateral sides, and the unactive area UA may be provided all of the four lateral sides. In other words, the unactive area UA may surround the edges of the active area AA. However, the embodiment is not limited thereto, but the unactive area UA may be provided only one lateral side of the active area AA.

In addition, the unactive area UA may be provided at three of four lateral sides of the active area AA. In other words, the unactive area UA may be provided at remaining lateral sides of the active area AA except for one lateral side of the active area AA. Further, the unactive area UA may be provided only two lateral sides of the four lateral sides of the active area AA. A bending area may be variously formed in the touch window according to various arrangements of the unactive area UA.

The substrate 100 may include various materials to support the sensing electrode 200, the wire 300, and a circuit board formed thereon. The substrate 100 may include a glass substrate or a plastic substrate. In detail, the substrate 100 may include chemically tempered glass, such as soda lime glass or aluminosilicate glass, plastic, such as polyethylene terephthalate (PET) or polyimide (PI), or sapphire.

The sapphire has superior electric characteristics, such as permittivity, so that a touch response speed may be remarkably increased and a space touch such as hovering may be easily implemented. The hovering signifies a technique of recognizing coordinates even at a distance shortly spaced apart from a display.

An outer dummy layer is formed in the unactive area UA of the substrate 100. The outer dummy layer may be coated with a material having a predetermined color so that the wire 300 and a printed circuit board connecting the wire 300 to an external circuit cannot be viewed from the outside. The outer dummy layer may be formed by coating a material having a predetermined color. The outer dummy layer may have a color suitable for a desired outer appearance thereof. For example, the outer dummy layer includes black pigments to represent black. In addition, a desired logo may be formed in the outer dummy layer through various schemes. The outer dummy layer may be formed through deposition, print, and wet coating schemes.

The active area AA of the substrate 100 includes first and second active areas 1AA and 2AA. The second active areas 2AA may be provided at a lateral side of the first active area 1AA. The second active areas 2AA may be provided at both lateral sides of the first active area 1AA. The first active area 1AA is provided therein with the first sensing electrode 210. The first sensing electrode 210 may sense a touch by an input device such as a finger.

The first sensing electrode 210 may extend in a second direction (leftward in drawings). Although the drawings show that the first sensing electrode 210 extends in the second direction, the embodiment is not limited thereto. Accordingly, the first sensing electrode 210 may extend in a first direction crossing the second direction. In addition, the first sensing electrode 210 may include two types of sensing electrodes in the first and second directions, respectively.

The first sensing electrode 210 may include a first material. The first material may include a metallic oxide, such as indium tin oxide, indium zinc oxide, copper oxide, tin oxide, zinc oxide, or titanium oxide. The above first materials have advantages in visibility since the first materials do not interrupt light transmission. However, the first materials may be physically easily stricken as a substrate is bent or curved.

The second sensing electrodes 220 are provided in the second active area 2AA. The second sensing electrodes 220 may sense the touch input by a finger or an input device. The second sensing electrode 220 may extend in the second direction (leftward in drawings). Although the drawings show that the second sensing electrode 220 extends in the second direction, the embodiment is not limited thereto. Accordingly, the second sensing electrode 220 may include two types of sensing electrodes in the first and second directions, respectively.

The second sensing electrode 220 may include a material different from a material constituting the first sensing electrode 210. In other words, the second sensing electrode 220 may include a second material different form the first material. For example, the second material may include nano-wire, carbon nano-tube (CNT), graphene, or various metals. The second materials have flexible properties for the curving and bending of the substrate. However, the second materials have disadvantages in visibility due to light reflection.

Figure 3:
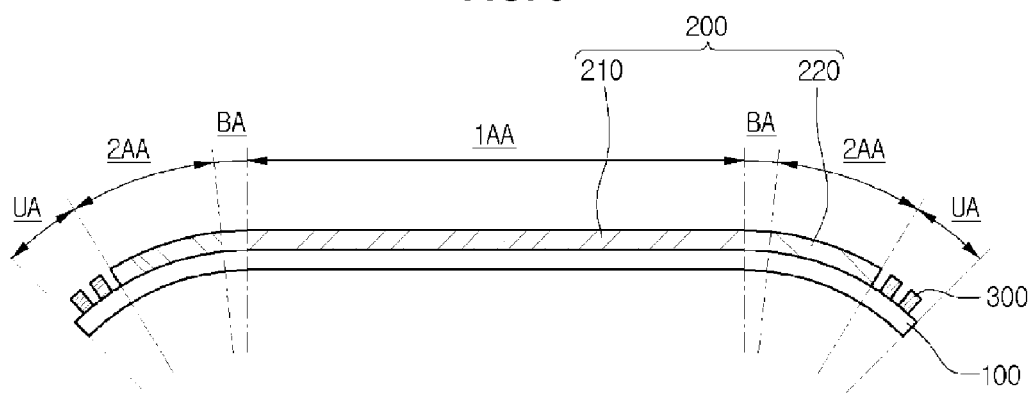
FIG. 3 is a sectional view taken along line I-I' of FIG. 2.

Referring to FIG. 3, the second active area 2AA may be bent from the first active area 1AA. In other words, the second active area 2AA may be bent. The second sensing electrode 220 provided in the second active area 2AA includes the second material having a flexible property, so that the second active area 2AA may be bent without a physical damage caused to the second sensing electrode 220.

Boundary parts BA are defined between the first active area 1AA and the second active areas 2AA. The boundary parts BA are provided at boundaries between the first active area 1AA and the second active area 2AA. At least one of the first and second sensing electrodes 210 or 220 may be provided in the boundary parts BA. In other words, the first or second sensing electrode 210 or 220 may be provided in the boundary part BA, or both of the first and second sensing electrodes 210 and 220 may be provided in the boundary part BA.

Figure 4:
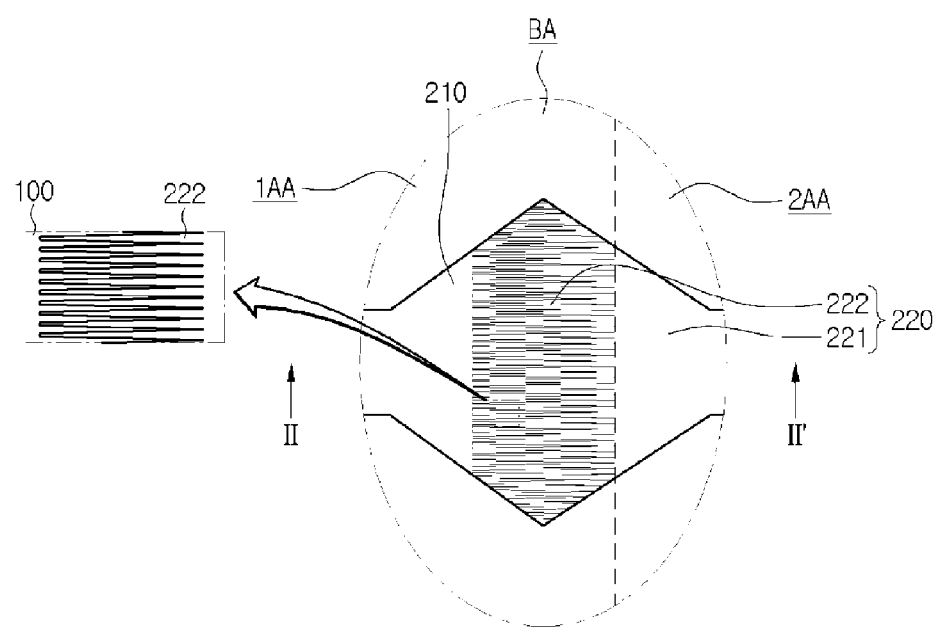
FIG. 4 is an enlarged view showing a part A of FIG. 2.
Figure 5:
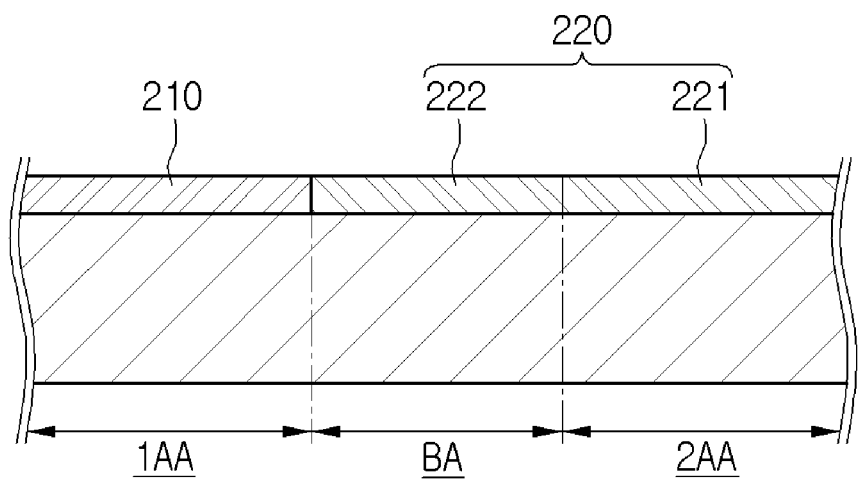
FIG. 5 is a sectional view taken along line II-II' of FIG. 4.

For example, referring to FIGS. 4 and 5, the second sensing electrode 220 is provided in the boundary part BA. The second sensing electrode 220 may include first and second sensing parts or sub-electrodes 221 and 222.

The first sensing part 221 is provided on the second active area 2AA. The second sensing part 222 extends from the first sensing part 221 and is provided in the boundary part BA. An end portion of the second sensing part 222 makes contact with the first sensing electrode 210. The second sensing part 222 makes contact with the first sensing electrode 210 so that the second sensing part 222 may be electrically connected with the first sensing electrode 210.

The first and second sensing parts 221 and 222 may include patterns different from each other. As shown in FIG. 4, different from the first sensing part 221, the second sensing part 222 may have a pattern to expose a top surface of the transparent substrate 100. Particularly, as the second sensing part 222 is closer to the first sensing electrode 210, an area to expose the top surface of the transparent substrate 100 may be increased. In other words, as the second sensing part 222 is closer to the first active area 1AA, the area to expose the top surface of the substrate 100 may be increased.

The second sensing part 222 may becomes gradually transparent toward the first sensing electrode 210. Therefore, the pattern of the second sensing part 222 may have a gradation effect. For example, the second sensing part 222 may have a saw-shaped pattern. However, the embodiment is not limited thereto, and the second sensing part 222 may have various patterns to more expose the top surface of the substrate 100 as the second sensing part 222 is closer to the first sensing electrode 210. The boundary between the second sensing electrode 220 including the second material having a relative disadvantage in visibility and the first sensing electrode 210 including the first material having a relative advantage in visibility may be removed.

The first and second sensing parts 221 and 222 may be different from each other in electrode density. The second sensing part 222 may have electrode density less than that of the first sensing part 221. An amount of the second material of the second sensing part 222 is more reduced as the second sensing part 222 is closer to the first sensing electrode 210, so that the heterogeneity between the second material having the disadvantage in visibility and the first material having the advantage in visibility can be reduced.

The heterogeneity, which a user feels at the boundary part BA due to the difference in material between the first and second sensing electrodes 210 and 220, may be reduced. The boundary part BA can be prevented from being viewed by the user due to the difference in an optical characteristic between the first and second materials.

The unactive area UA is provided at a lateral side of the second active area 2AA. In other words, the unactive area UA is provided adjacent to the second active area 2AA. A wire 300 may be formed in the unactive area UA to electrically connect the sensing electrodes 200 with each other. The wire 300 may include metal representing superior electrical conductivity. For example, the wire 300 may include chromium (Cr), nickel (Ni), copper (Cu), aluminum (Al), silver (Ag), molybdenum (Mo), and the alloy thereof. In particular, the wire 300 may include various metal paste materials which may be easily formed through a printing process.

Figure 6:
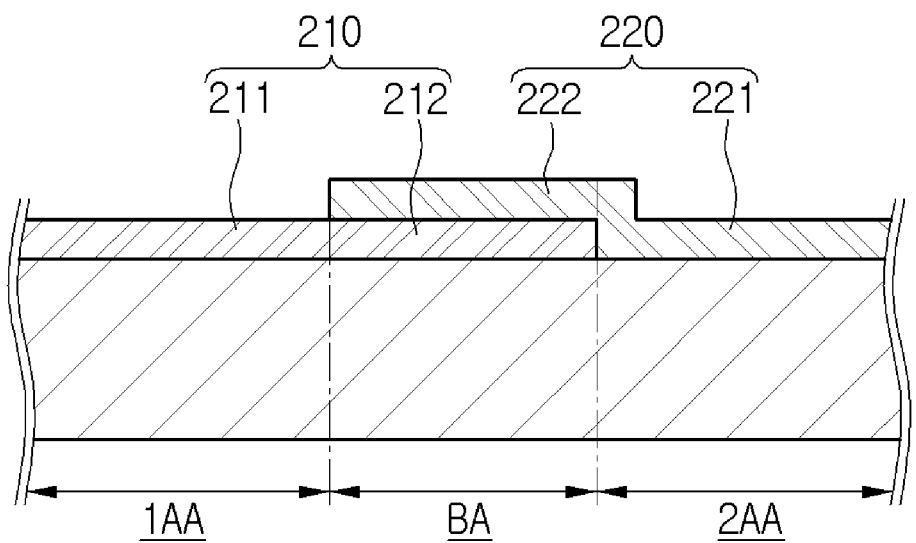
FIGS. 6 and 7 are views showing a touch window according to another embodiment.
Figure 7:
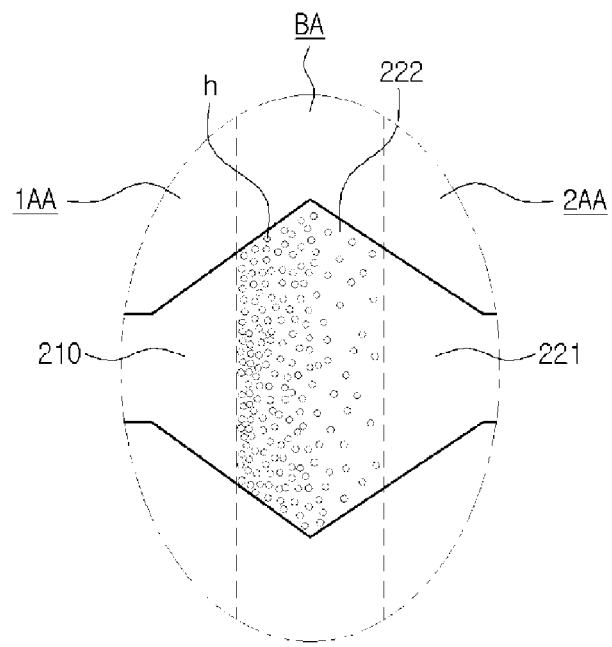

A touch window according to another embodiment will be described with reference to FIGS. 6 and 7. The details of structures and components the same as or similar to those described above will be omitted below. FIGS. 6 and 7 are views showing a touch window according to a second embodiment.

Referring to FIG. 6, both of the first and second sensing electrodes 210 and 220 may be arranged in the boundary part BA. In other words, the first and second sensing electrode 210 and 220 may be overlapped with each other in the boundary part BA. The first sensing electrode 210 includes third and fourth sensing parts or sub-electrodes 211 and 212. The third sensing part 211 is provided in the first active area 1AA, and the fourth sensing part 212 may extend from the third sensing part 211 so that the fourth sensing part 212 may be provided in the boundary part BA.

The second sensing electrode 220 includes first and second sensing parts or sub-electrode 221 and 222. The first sensing part 221 may be provided in the second active area 2AA, and the second sensing part 222 may extends from the first sensing part 221 so that the second sensing part 222 may be provided in the boundary part BA. Both of the second sensing part 222 and the fourth sensing part 212 may be provided in the boundary part BA. In other words, the second sensing part 222 may be overlapped with the fourth sensing part 212.

The second sensing part 222 including the second material having the relative disadvantage in visibility has a pattern the same as or similar to the above-described pattern shown in FIG. 4, so that the visibility can be improved in the boundary part BA. Even if the second sensing part 222 is overlapped with the fourth sensing part 212, the heterogeneity resulting from the difference in materials constituting the second sensing part 222 and the fourth sensing part 212 can be prevented.

Referring to FIG. 7, the second sensing part 222 may be provided in the boundary part BA and may include a plurality of holes h. The holes h may expose the top surface of the transparent substrate 100. The number of the holes may be increased toward the first sensing electrode 210, i.e., the density of the holes may be increased toward the first active area 1AA. The heterogeneity between the first sensing electrode 210 having an advantage in visibility and the second sensing electrode 220 having a relative disadvantage in visibility can be reduced by holes.

Figure 8:
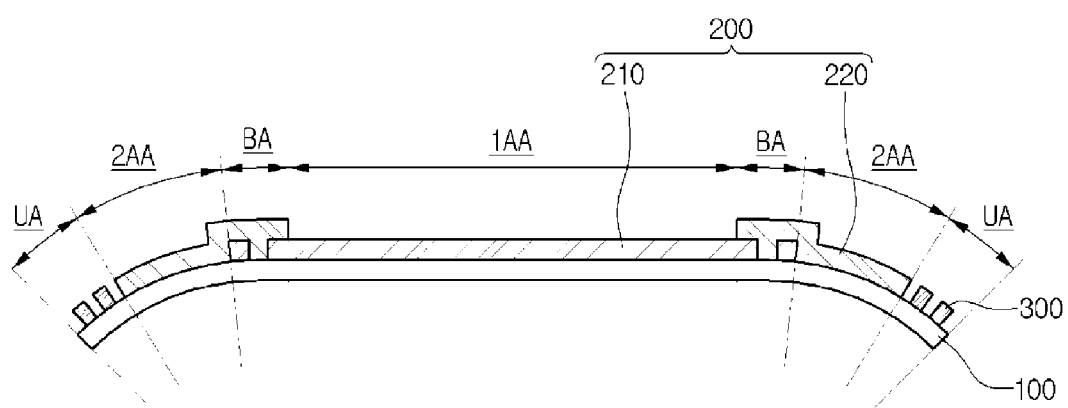
FIGS. 8 to 11 are views showing a touch window according to another embodiment.
Figure 9:
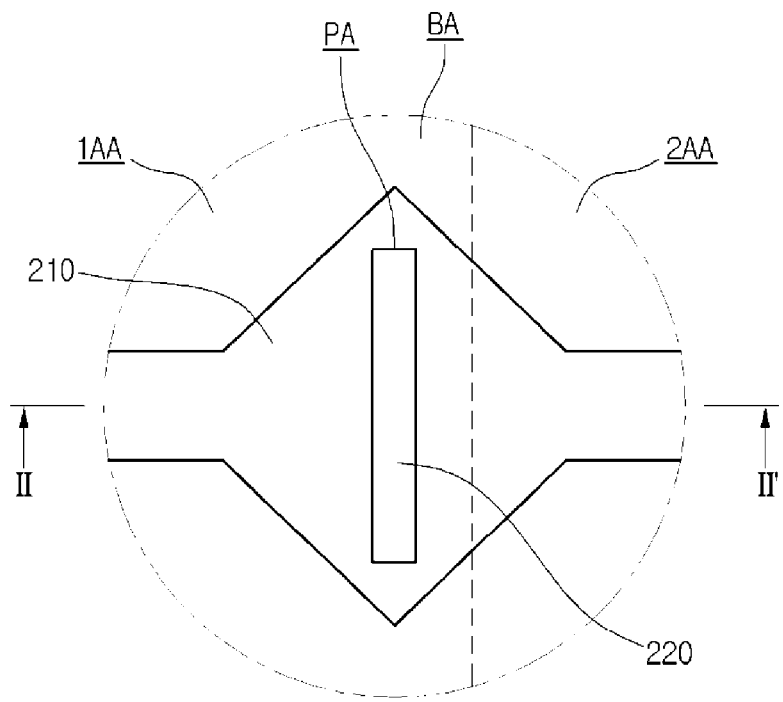

A touch window according to another embodiment will be described with reference to FIGS. 8 and 9. The second active area 2AA may be bent from the first active area 1AA. The second sensing electrode 220 provided in the second active area 2AA includes a second material having a flexible property, so that the second active area 2AA may be bent without a physical damage to the second sensing electrode 220.

Boundary parts BA are defined between the first active area 1AA and the second active area 2AA. The boundary parts BA are provided at boundaries between the first active area 1AA and the second active area 2AA. The first and second sensing electrodes 210 and 220 may be provided in the boundary part BA. At least portions of the first and second sensing electrodes 210 and 220 may be vertically arranged to contact each other in the boundary part BA.

Figure 10:
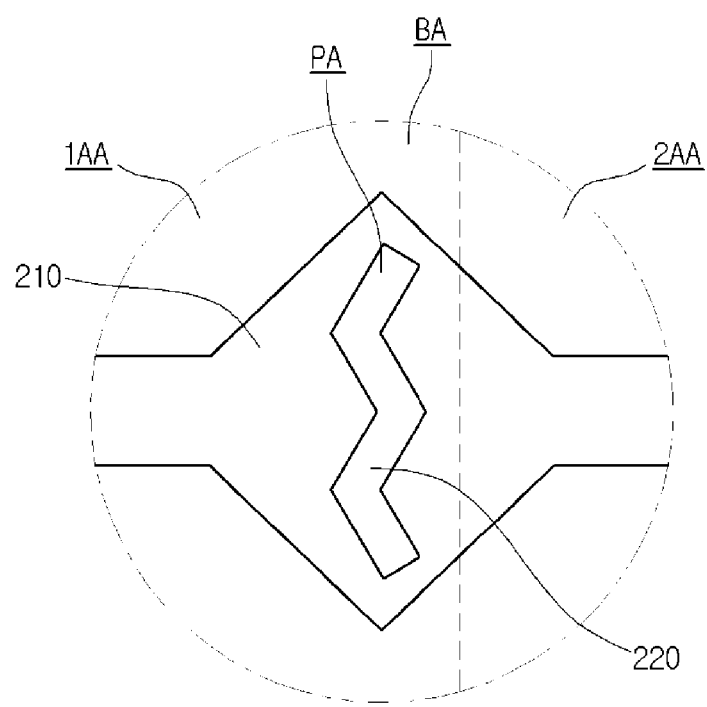

The boundary part BA may include a pattern PA. The pattern PA may be an opening or hole to expose the top surface of the substrate 100. Although FIG. 9 shows that the pattern PA has a rectangular shape, the embodiment is not limited thereto. As shown in FIG. 10, the pattern PA may have a zigzag shape. The pattern PA may have various shapes such as a circular shape or a polygonal shape. Although FIG. 9 shows one pattern PA, the embodiment is not limited thereto, such that a plurality of patterns PA may be provided in the boundary part BA.

Figure 11:
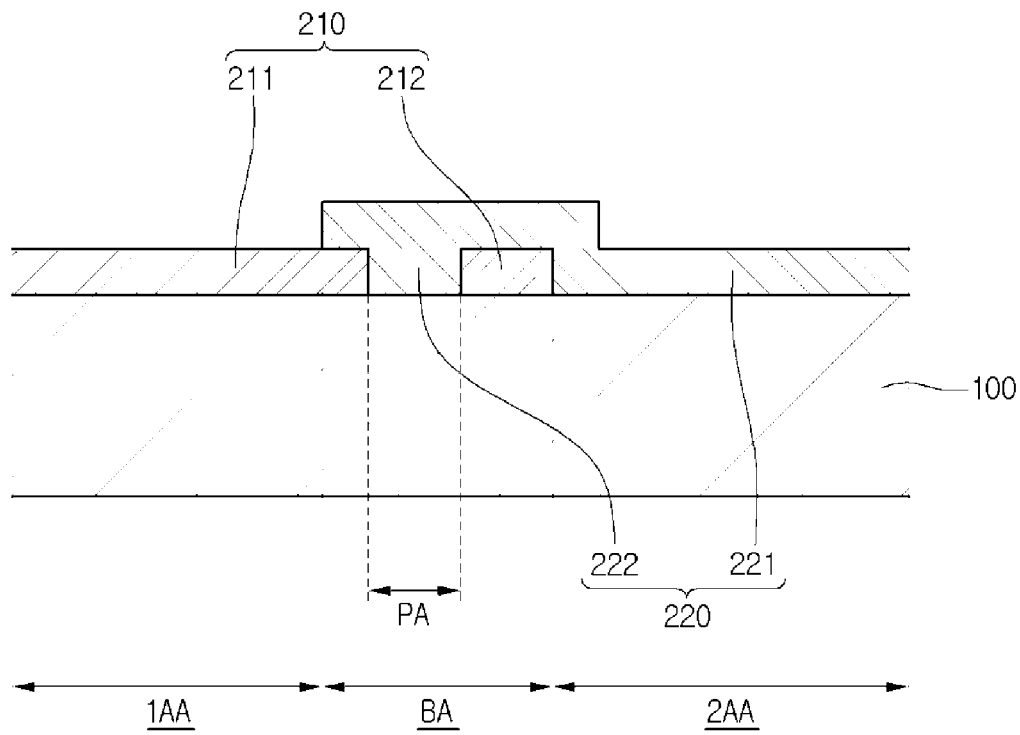

The second sensing electrode 220 may be provided in the pattern PA. A portion of the second sensing electrode 220 may directly make contact with the top surface of the substrate 100. Referring to FIG. 11, the first sensing electrode 210 may include the third and fourth sensing parts or sub-electrodes 211 and 212. The third sensing part 211 is provided in the first active area 1AA. The fourth sensing part 212 extends from the third sensing part 211 so that the fourth sensing part 212 is provided in the boundary part BA. An end portion of the fourth sensing part 212 makes contact with the second sensing electrode 220. The fourth sensing part 212 makes contact with the second sensing electrode 220, so that the fourth sensing part 212 may be electrically connected with the second sensing electrode 220.

In this case, the third and fourth sensing parts or sub-electrodes 211 and 212 may have mutually different patterns PA. As shown in FIG. 10, the fourth sensing part 212 may have the pattern PA to expose the top surface of the transparent substrate 100 different from the third sensing part 211. The second sensing electrode 220 may include the first and second sensing parts 211 and 222. The first sensing part 221 is provided in the second active area 2AA. The second sensing part 222 extends from the first sensing part 221 so that the second sensing part 222 is provided in the boundary part BA. The second sensing part 222 may make contact with the fourth sensing part 212. The second sensing part 222 may be provided in the pattern PA of the fourth sensing part 212.

The difference in adhesive strength with the substrate 100 between the first and second sensing electrodes 210 and 220 resulting from the difference in material between the first and second sensing electrodes 210 and 220 at the boundary part BA can be prevented. The sensing electrodes can be prevented from being delaminated from the flexible touch window, so that the reliability of the touch window can be improved.

Figure 12:
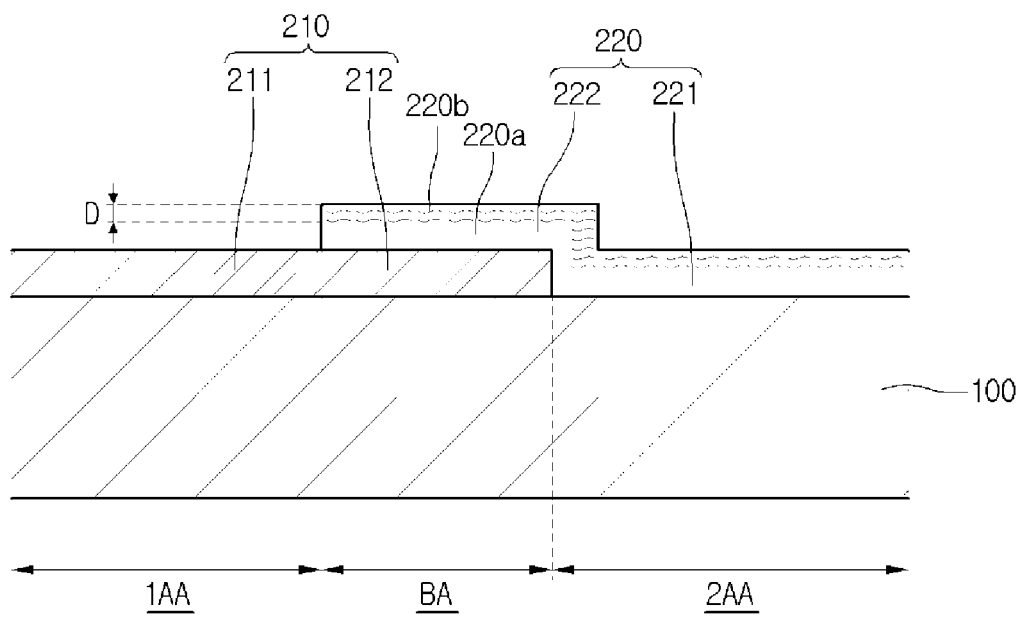

A touch window according to another embodiment will be described with reference to FIGS. 12 to 16. Referring to FIGS. 12 to 13, the second sensing electrode 220 of a touch window according to a fourth embodiment may include a base 220a and an electrode 220b provided on the base 220a. The electrode 220b may be provided on the base 220a. The electrode 220b actually performs an electrical function at an upper portion of the base 220a.

The base 220a includes a photosensitive material so that the second sensing electrode 220 may be formed through an exposure and development process. The electrode 220b may include a nano-wire. The electrode 220b may include a metallic nano-wire.

The nano-wire is provided on the second sensing electrode 220. The nano-wire may be provided only in a region D at a distance of 1 μm from an upper portion of the second sensing electrode 200. The nano-wire may exist only in a region D at a distance of 100 nm from the upper portion of the second sensing electrode 220.

The concentration of the nano-wires may be increased toward the surface of the base 220a. The concentration of the nano-wires may be the number of the nano-wires existing in the same volume. The concentration of the nano-wires may be increased gradually toward an upper surface of the electrode 220b.

The second sensing electrode 220 may include a photosensitive nano-wire film. As the second sensing electrode 220 is formed of the photosensitive nano-wire film, the thickness of the second sensing electrode 220 may be reduced. In other words, the whole thickness of the second sensing electrode 220 may be reduced even though the second sensing electrode 220 includes nano-wires. According to the related art, an over-coating process must be additionally performed in order to prevent the nano-wires from being oxidized if the electrode part includes the nano-wires. Accordingly, the processes are complicated, and the thickness of the touch window is increased.

Referring to FIG. 12, the nano-wires may be provided at the upper portion of the second sensing electrode 220. Accordingly, the base 220a may bond the first sensing electrode 210 to the second sensing electrode 220. Alternatively, referring to FIG. 13, the nano-wires may be provided only at the lower portion of the second sensing electrode 220. In this case, although not shown in drawings, an additional adhesive layer may be interposed between the first and second sensing electrodes 210 and 220.

Referring to FIG. 14, the second sensing electrode 220 may include nano-wires. For example, the second sensing electrode 220 may include a photosensitive nano-wire film. The photosensitive nano-wire film is formed by providing the nano-wires in the photosensitive film, so that the nano-wire can be prevented from being oxidized even though an over-coating layer is not provided. The photosensitive nano-wire film is advantageous in thickness. If the second sensing electrode 220 includes the photosensitive nano-wire film, a patterning process can be easily performed through an exposure and development process.

The second sensing electrode 200 includes the first sensing part 221 and the second sensing part 222 extending from the first sensing part 221 and provided in the boundary part BA. In this case, the density of the nano-wires included in the second sensing part 222 may be reduced as the second sensing part 222 is closer to the first sensing electrode 210. In other words, the number of the nano-wires included in the second sensing part 222 may be reduced as the second sensing part 222 is closer to the first sensing electrode 210. The number of the nano-wires may be reduced as the second sensing part 222 is closer to the first active area 1AA.

Figure 15:
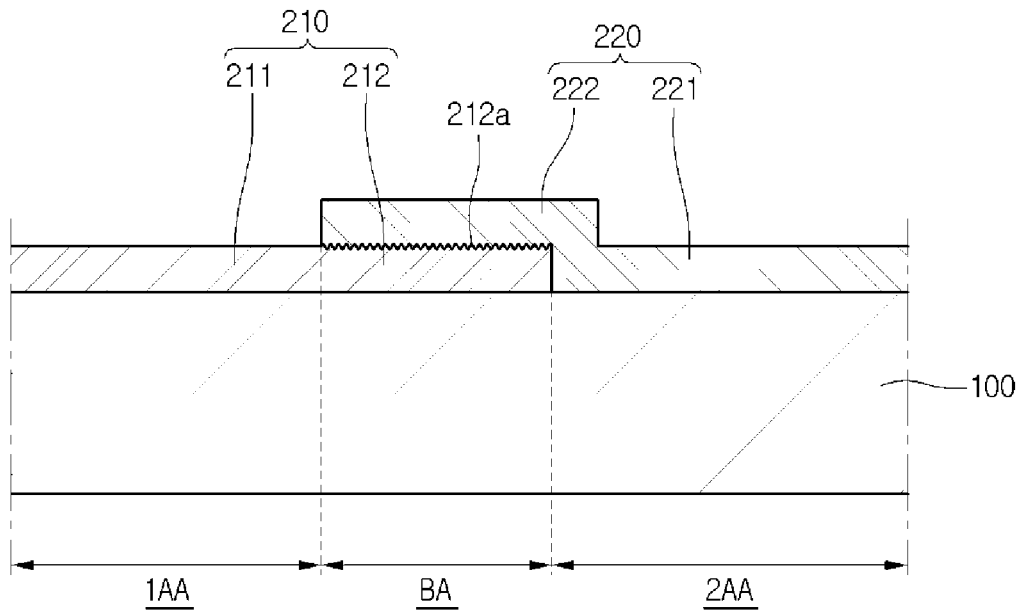

Referring to FIG. 15, in a touch window according to a fifth embodiment, fine protrusions 212a may be included in the first sensing electrode 210. In detail, the fine protrusions 212a may be provided on a top surface of the first sensing electrode 210 making contact with the second sensing electrode 220. The fine protrusions 212a may be provided on the top surface of the fourth sensing part 212 provided in the boundary part BA. The top surface of the fourth sensing part 212 may have roughness greater than that of the top surface of the third sensing part 211. An adhesive strength between the first and second sensing electrodes 210 and 220 is improved.

The fine protrusions 212a may perform an anti-reflection function, so that the pattern of the sensing electrode 200 can be prevented from being viewed. In this case, the fine protrusions 212a may be provided on the top surface of the third sensing part 211 as well as the fourth sensing part 212. The fine protrusions 212a may be provided on the entire top surface of the first sensing electrode 210.

Figure 16:
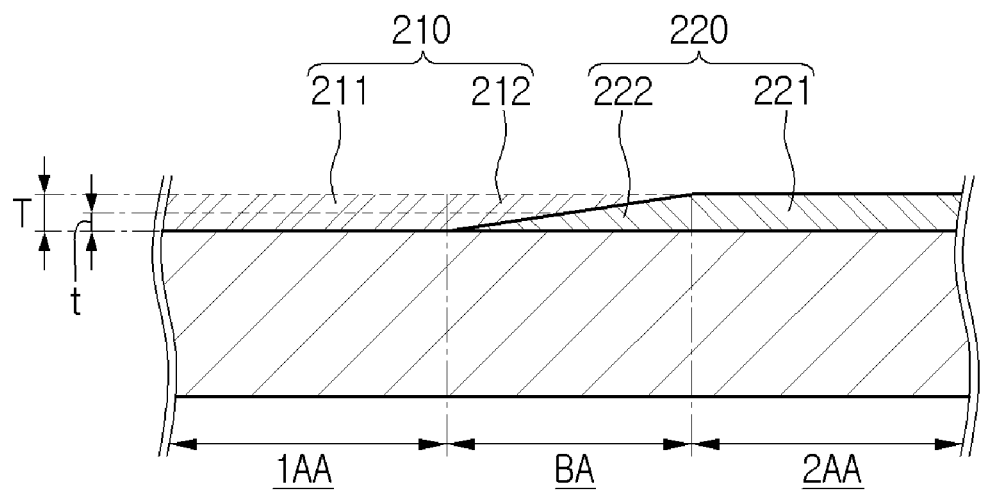

In addition, referring to FIG. 16, the second sensing part 222 and the fourth sensing part 212 are provided in the boundary part BA. The thickness t of the second sensing part 222 provided in the boundary part BA may be thinner than that of the thickness T of the first sensing part 221. The thickness t of the second sensing part 222 may be reduced as the second sensing part 222 is gradually away from the first sensing part 221. The thickness of the second sensing part 222 may be reduced as the second sensing part 222 is closer to the first sensing electrode 210.

Similarly, the thickness of the fourth sensing part 212 provided in the boundary region BA may be reduced as the fourth sensing part 212 is gradually away from the third sensing part 211. The thickness of the fourth sensing part 212 may be reduced as the fourth sensing part 212 is closer to the second sensing electrode 220.

The embodiment has been described about the touch window having the structure in which the boundary part BA is interposed between the first and second active areas 1AA and 2AA, and various types of sensing electrodes are provided in the boundary part BA.

Hereinafter, a different type of a connection structure between the first and second active areas 1AA and 2AA will be described with reference to accompanying drawings. FIGS. 17 to 24 are views showing various touch windows according to the embodiment.

Figure 17:
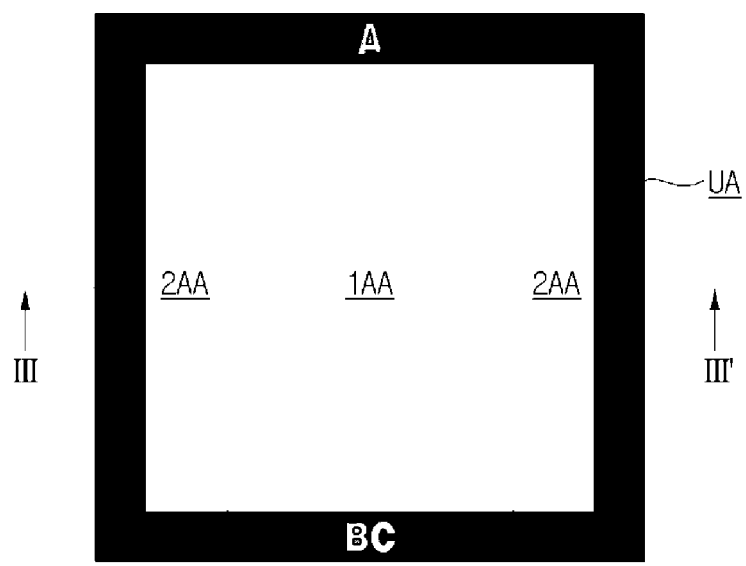
FIG. 17 is a plan view schematically showing a touch window according to another embodiment.
Figure 18:
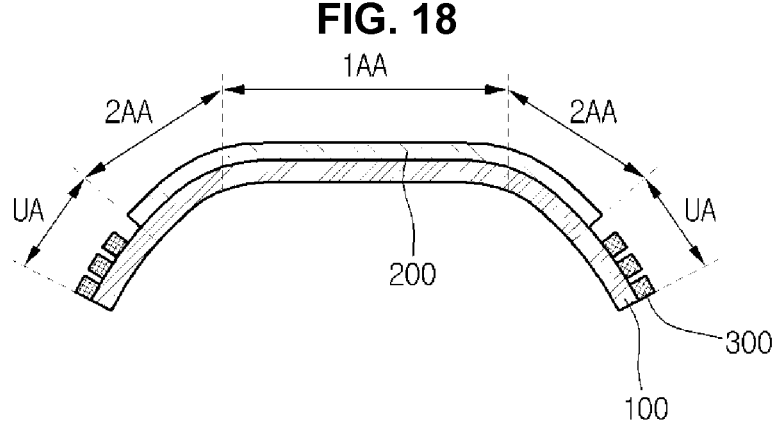
FIG. 18 is a sectional view taken along line III-III' of FIG. 17.

Referring to FIGS. 17 and 18, the second active area 2AA may be provided at a lateral side of the first active area 1AA. Accordingly, both lateral sides of the first active area (1AA) may be bent.

Figure 19:
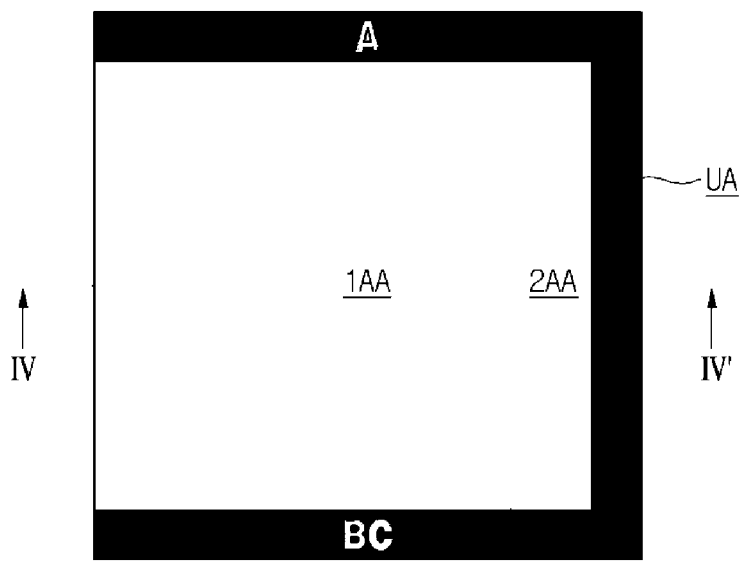
FIG. 19 is a plan view schematically showing a touch window according to another embodiment.
Figure 20:
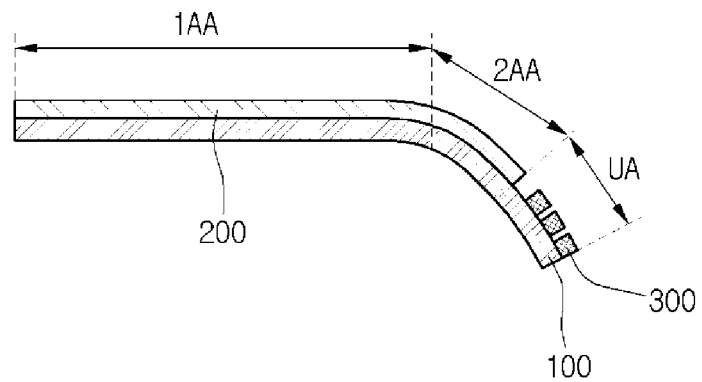
FIG. 20 is a sectional view taken along line IV-IV' of FIG. 19.

Referring to FIGS. 19 to 20, the second active area 2AA may be provided at the lateral side of the first active area 1AA. The second active area 2AA may be provided only at one lateral side of the first active area 1AA. Accordingly, only one lateral side of the substrate 100 adjacent to the first active area 1AA may be bent. The unactive area UA may be provided at three lateral sides of the active area AA. In other words, the unactive area UA may be provided at the lateral sides of the active area AA except for one lateral side of the active area AA.

Figure 21:
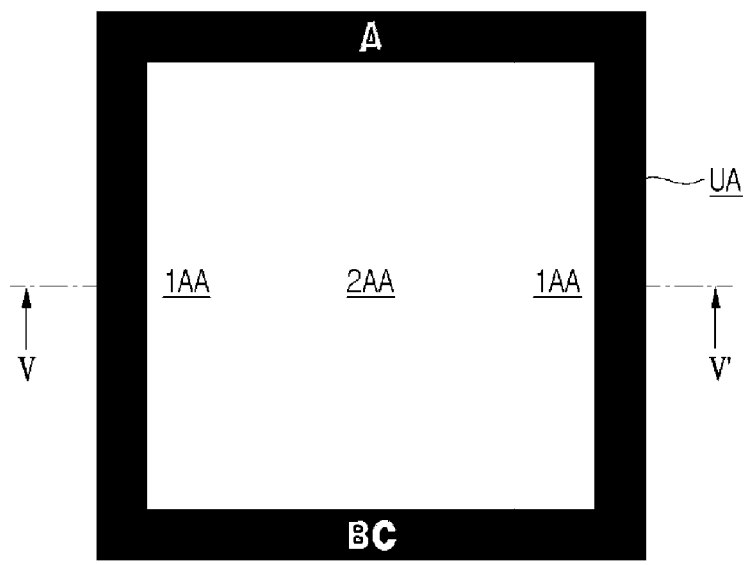
FIG. 21 is a plan view schematically showing a touch window according to another embodiment.
Figure 22:
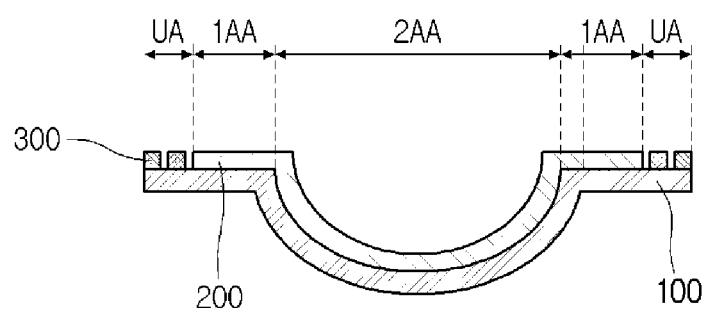
FIG. 22 is a schematic sectional view taken along line V-V' of FIG. 21.

Referring to FIGS. 21 and 22, the first active area 1AA may be provided at a lateral side of the second active area 2AA. The first active area 1AA may be provided at both lateral sides of the second active area 2AA.

Figure 23:
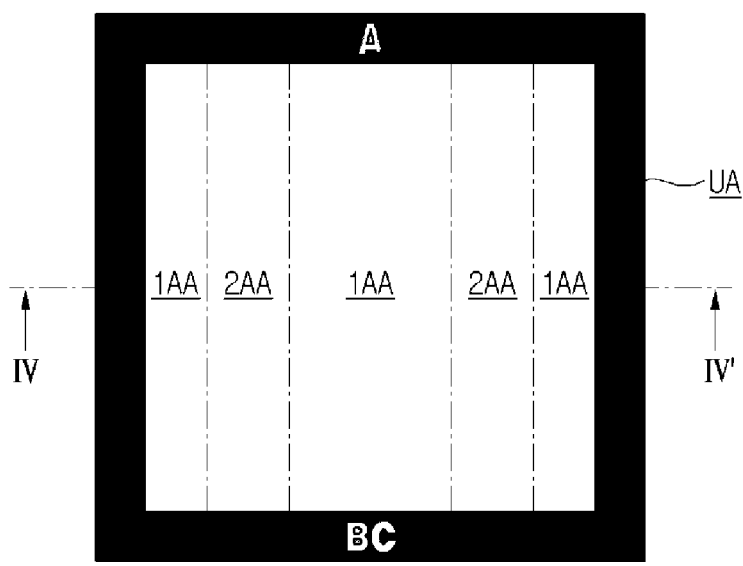
FIG. 23 is a plane view schematically showing a touch window according to another embodiment.
Figure 24:
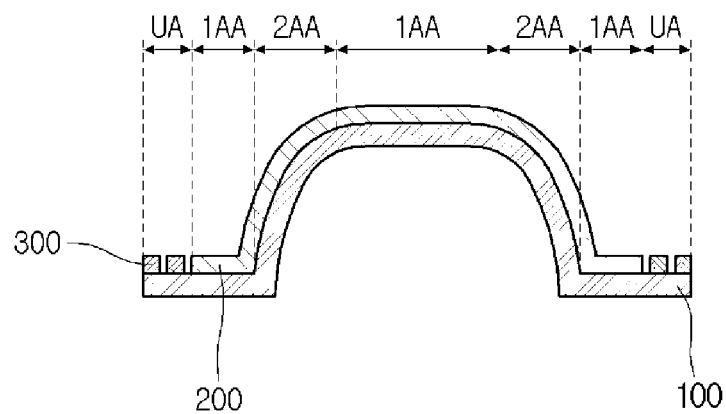
FIG. 24 is a schematic sectional view taken along lien VI-VI' of FIG. 23.

Referring to FIGS. 23 and 24, a plurality of first active areas 1AA and a plurality of second active areas 2AA may be provided. Accordingly, the second active area 2AA may be provided between the first active areas 1AA. In addition, the first active area 1AA may be provided between the second active areas 2AA.

Accordingly, the diversities in the structure of a flexible touch window can be ensured.

Figure 25:
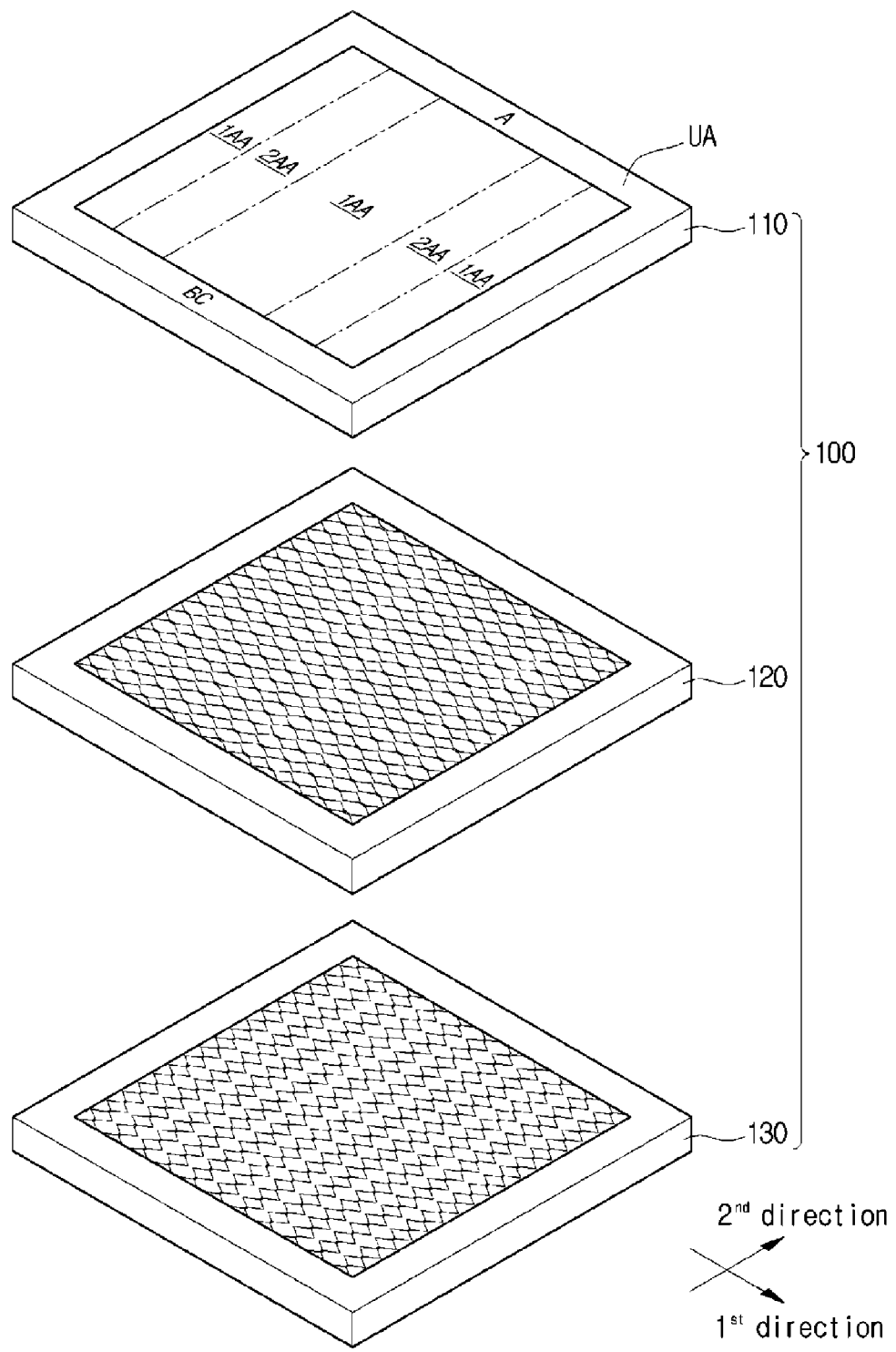
FIG. 25 is an exploded perspective view showing a touch window according to another embodiment.

Hereinafter, the touch window will be described in more detail with reference to FIGS. 25 and 26. Referring to FIG. 25, in the touch window according to the embodiment, substrates 100 include a protective substrate 110, a first substrate 120, and a second substrate 130.

The protective substrate 110 is provided at the uppermost portion of the touch window. The protective substrate 110 may protect components provided under the protective substrate 110. The protective substrate 110 may include a glass substrate, a plastic substrate including poly ethylene terephthalate (PET) film, or polyimide (PI), or sapphire, but the embodiment is not limited thereto. In other words, the protective substrate 110 may include various materials having strength capable of performing a protective function.

The first substrate 120 may be provided under the protective substrate 110. The first substrate 120 may support the first sensing electrode 210 and the first wire 310 formed thereon. The first substrate 120 may include a glass substrate, a plastic substrate including poly ethylene terephthalate (PET) film or polyimide (PI), or sapphire.

Figure 26:
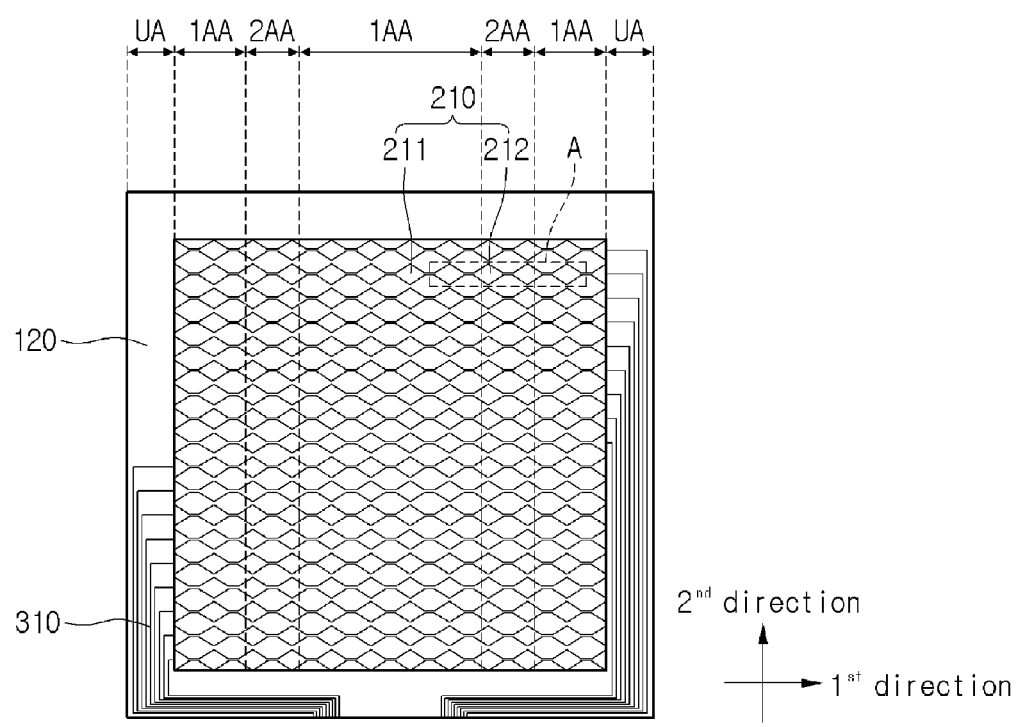
FIG. 26 is a plan view showing one surface of one substrate included in the touch window according to another embodiment.

Referring to FIG. 26, the first sensing electrode 210 may be provided on the first substrate 120. In detail, the first sensing electrode 210 may be provided in the active areas 1AA and 2AA of the first substrate 120. In other words, the first sensing electrode 210 may be provided in the first and second active areas 1AA and 2AA. The first sensing electrode 210 may detect the position of the input device. In detail, the first sensing electrode 210 may transmit an electrical signal when a touch occurs by the input device.

The first sensing electrode 210 may extend in the first direction. The first sensing electrode 210 includes third and fourth sensing parts or sub-electrodes 211 and 212. The third sensing part 211 may be provided on the first active area 1AA. The fourth sensing part 212 may be provided on the second active area 2AA.

The third and fourth sensing parts or sub-electrodes 211 and 212 may have patterns corresponding to each other. In other words, the third and fourth sensing parts or sub-electrodes 211 and 212 may have the same pattern.

Referring to FIG. 26, although the first sensing electrode 210 is shown in the shape of a diamond, but the embodiment is not limited thereto. Accordingly, the first sensing electrode 210 may have various shapes, such as a polygonal shape including a triangular shape or a quadrangular shape, a circular shape, an oval shape, a linear shape or an H shape.

The first sensing electrode 210 may have the thickness in the range of 0.01 μm to 20 μm. The third and fourth sensing parts 211 and 212 may include mutually different materials. In detail, the third and fourth sensing parts 211 and 212 may include materials having mutually different properties.

For example, the third sensing part 211 may include a first material. The first material may include metal oxide such as indium tin oxide, indium zinc oxide, copper oxide, tin oxide, zinc oxide, or titanium oxide. The first material does not interrupt light transmission, so that the first material is very advantageous in visibility. However, the first material may be physically easily damaged as the substrate is bent or curved.

The forth sensing part 212 may include first and second materials. For example, the second materials may include various materials such as nano-wires, carbon nano-tubes or graphene. In particular, the second material may include a photosensitive nano-wire film in which nano-wires are provided in the photosensitive material. In addition, the fourth sensing part 212 may include the second material, and may be provided in the shape of a mesh. The second material has a flexible property for the curving and bending of the substrate. However, the second material may have a disadvantage in visibility due to light reflection. To the contrary, the third sensing part 211 may include a second material, and the fourth sensing part 212 may include a first material.

The third sensing part 211 or the fourth sensing part 212 in the first active area 1AA includes the first material so that the visibility on the first active area 1AA can be maintained.

According to the embodiment, a touch window having both of a superior bending property and a superior visibility can be ensured.

Figure 27:
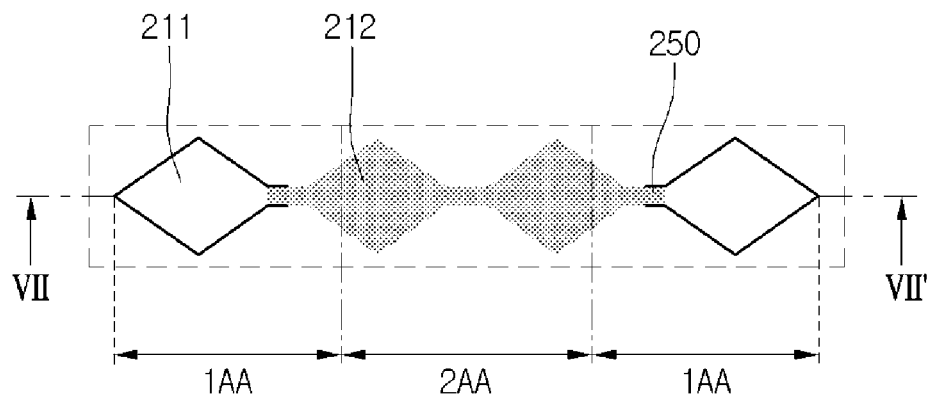
FIG. 27 is an enlarged view showing a part A of FIG. 26.
Figure 28:
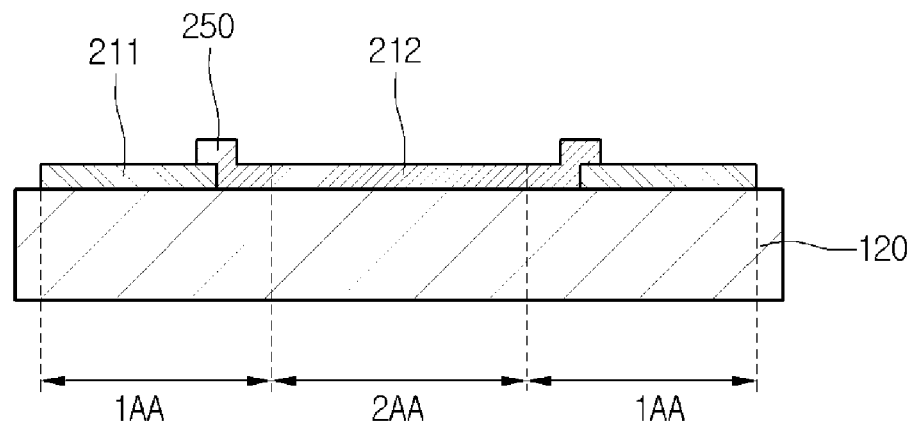
FIG. 28 is a sectional view taken along line VII-VII' of FIG. 27.

A connection electrode 250 is additionally provided to electrically connect the third sensing part 211 to the fourth sensing part 212. Referring to FIGS. 27 and 28, the connection electrode 250 may extend from the fourth sensing part 212. Accordingly, the connection electrode 250 may include a second material. In other words, the connection electrode 250 may include the same material as that of the fourth sensing part 212. The connection electrode 250 extends from the fourths sensing part 121 to make contact with the third sensing part 211.

Figure 29:
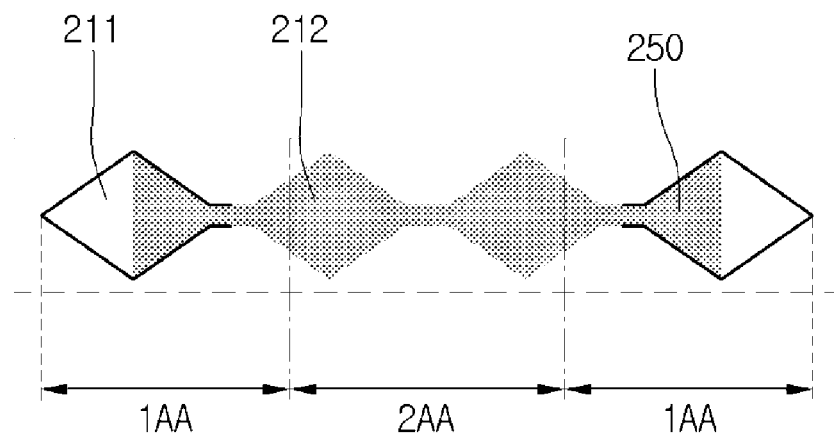
FIGS. 29 to 34 are enlarged views showing the touch window according to another embodiment.

Meanwhile, referring to FIG. 29, the embodiment is not limited thereto, and the connection electrode 250 is extended from the fourth sensing part 212 so that the connection electrode 250 may be provided in a portion of the third sensing part 211. In this case, the connection electrode 250 may be provided on the top surface of the third sensing part 211.

Figure 30:
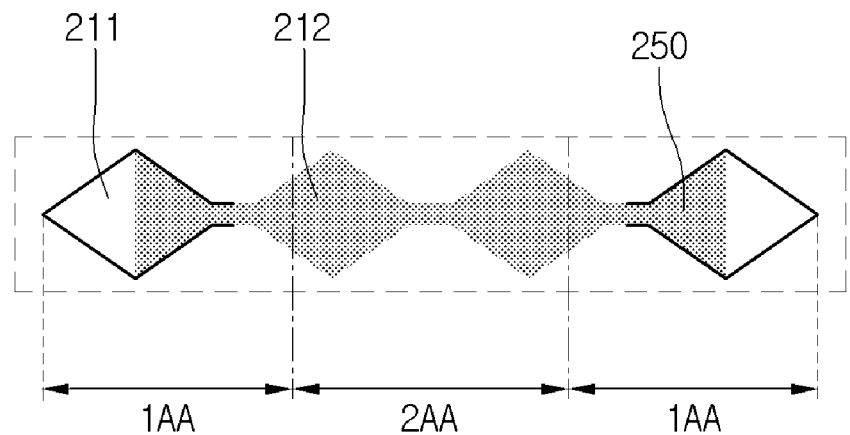

In addition, referring to FIG. 30, the connection electrode 250 extends from the fourth sensing part 212 so that the connection electrode 250 may be provided on the entire surface of the third sensing part 211. In this case, the connection electrode 250 may be provided on the top surface of the third sensing part 211. Accordingly, the connection electrode 250 provided on the top surface of the third sensing part 211 may have the same pattern as that of the third sensing part 211.

Figure 31:
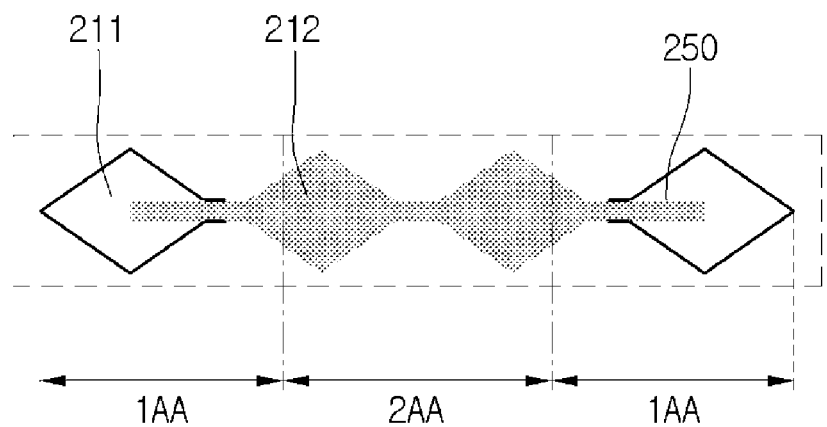

Meanwhile, referring to FIG. 31, the connection electrode 250 extends from the fourth sensing part 212 so that the connection electrode 250 may be provided only at a portion of the third sensing part 211. In other words, the connection electrode 250 may be provided only at the minimum area of the third sensing part 211. In this case, the connection electrode 250 may have a straight line pattern.

Figure 32:
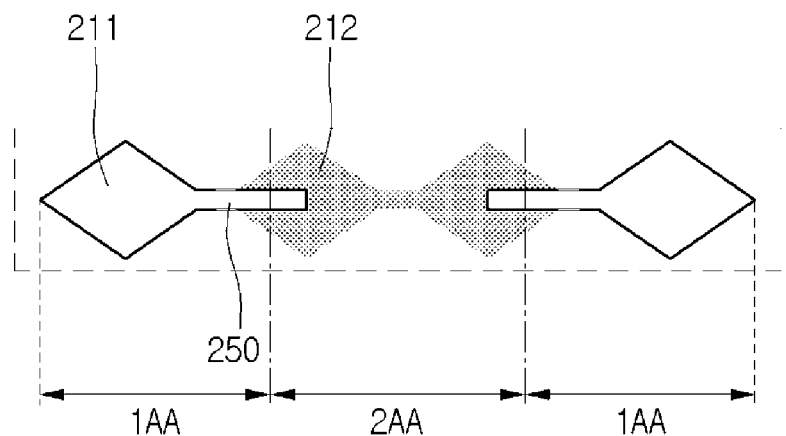

Meanwhile, referring to FIG. 32, the connection electrode 250 may extend from the third sensing part 211. Accordingly, the connection electrode 250 may include the first material. In other words, the connection electrode 250 may include the same material as that of the third sensing part 211. The connection electrode 250 extends from the third sensing part 211 to make contact with the fourth sensing part 212.

Figure 33:
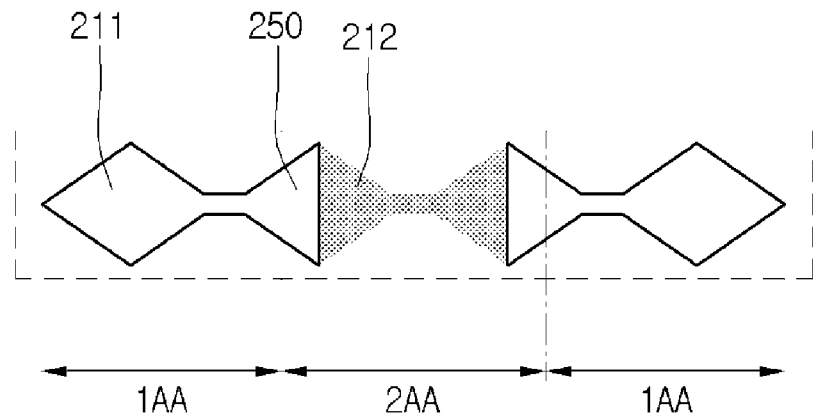

Referring to FIG. 33, the connection electrode 250 extends from the fourth sensing part 211 so that the connection electrode 250 may be provided at a portion of the third sensing part 212. The connection electrode 250 may be provided on the top surface of the fourth sensing part 212.

Figure 34:
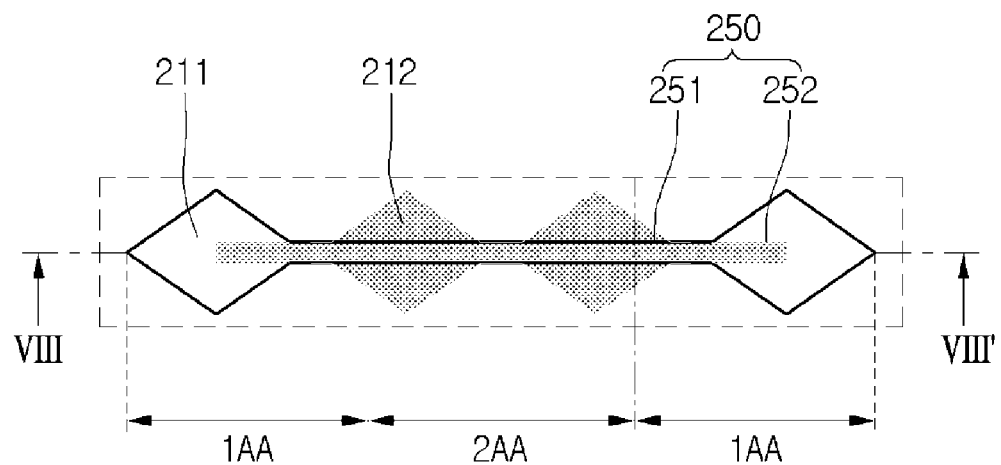
Figure 35:
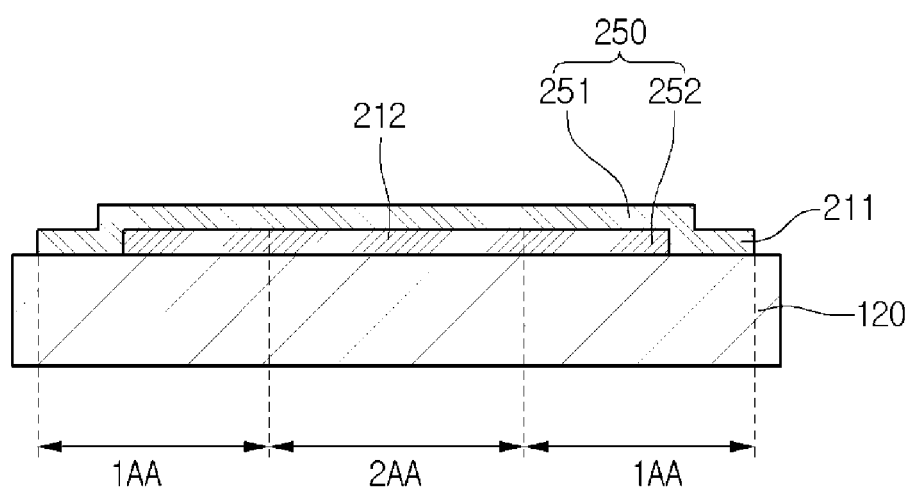
FIG. 35 is a sectional view taken along line VIII-VIII' of FIG. 34.

Referring to FIGS. 34 and 35, the connection electrode 250 may include first and second connection electrodes 251 and 252. The first connection electrode 251 may include the first material. The first connection electrode 251 may extend from the third sensing part 211. The second connection electrode 252 may include a second material. The second connection electrode 252 may extend from the fourth sensing part 212. The first connection electrode 251 may vertically make contact with the second connection electrode 252.

Figure 36:
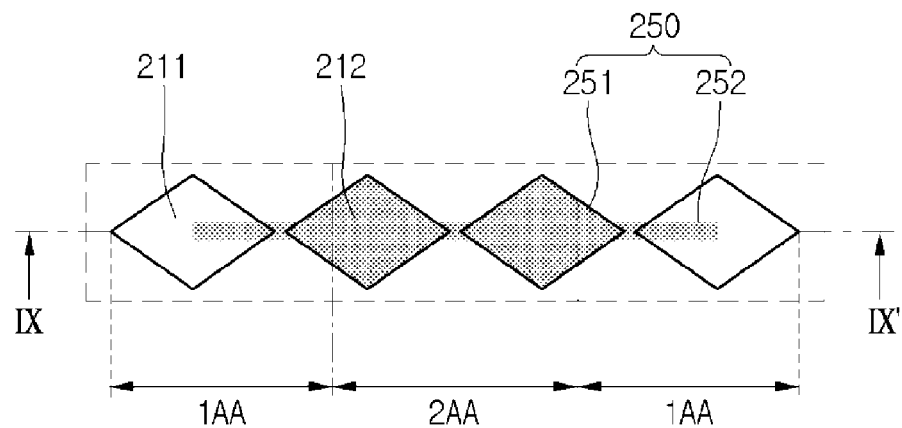
FIG. 36 is an enlarged view showing a touch window according to another embodiment.
Figure 37:
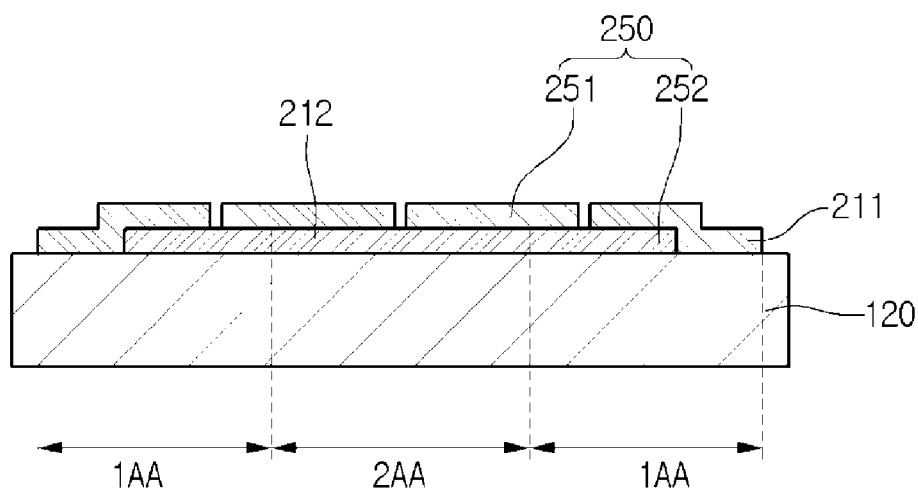
FIG. 37 is a sectional view taken along line IX-IX' of FIG. 36.

Referring to FIGS. 36 and 37, the connection electrode 250 may include first and second connection electrodes 251 and 252. The first connection electrode 251 may be provided on the entire surface of the fourth sensing part 212. The first connection electrode 251 may include the same material as that of the third sensing part 211. In addition, the first connection electrode 251 may have the same pattern as that of the fourth sensing part 212. The second connection electrode 252 may extend from the fourth sensing part 212. The second connection electrode 252 may be connected with the third sensing part 211. The second connection electrode 252 may vertically make contact with the third sensing part 211.

Figure 38:
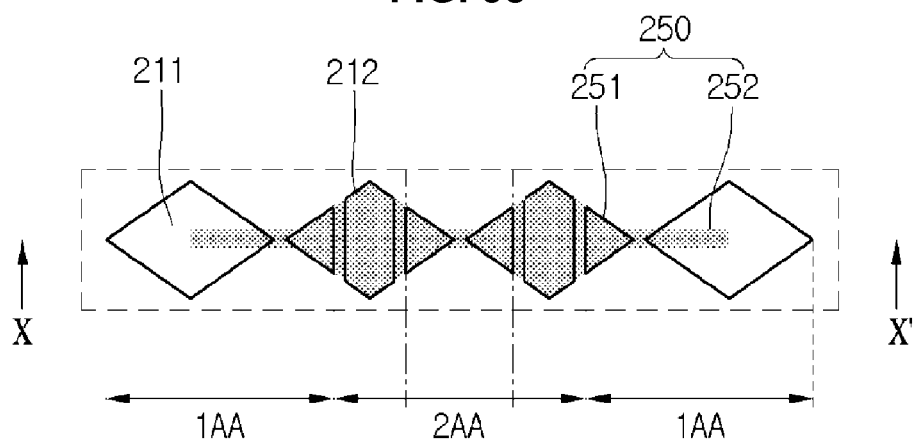
FIG. 38 is an enlarged view showing a touch window according to another embodiment.
Figure 39:
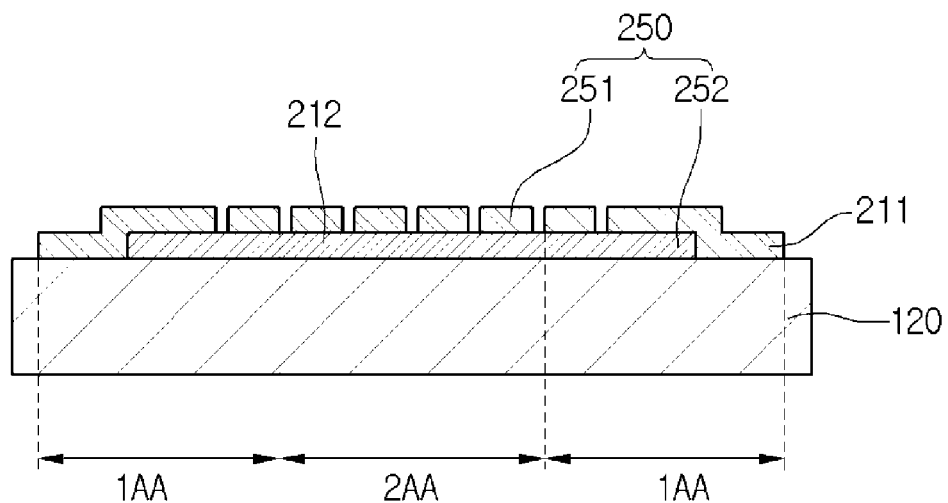
FIG. 39 is a sectional view taken along line X-X' of FIG. 38.

Referring to FIGS. 38 and 39, the connection electrode 250 may include the first and second connection electrodes 251 and 252. The first connection electrode 251 may be provided on the fourth sensing part 212. The first connection electrode 251 may be provided at a portion of the fourth sensing part 212. In other words, as shown in FIG. 38, the first connection electrode 251 may be partially provided on the top surface of the fourth sensing part 212. The second connection electrode 252 may extend from the fourth sensing part 212. The second connection electrode 252 may be connected with the third sensing part 211. The second connection electrode 252 may vertically make contact with the third sensing part 211.

Figure 40:
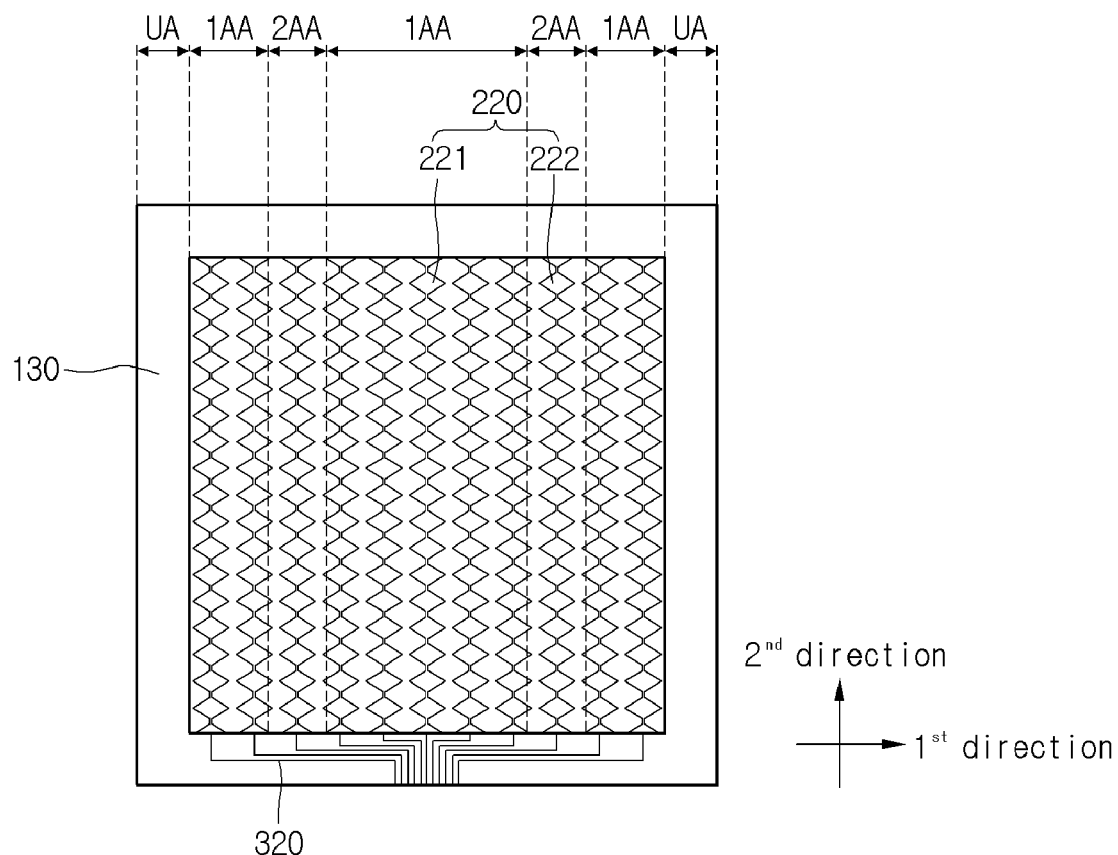
FIG. 40 is a plan view showing one surface of another substrate included in a touch window according to another embodiment.

Referring to FIGS. 25 and 40, the second substrate 130 may be provided under the protective substrate 110. The second substrate 130 may support the second sensing electrode 220 and the second wire 320 formed thereon. The second substrate 130 may include a glass substrate, a plastic substrate including poly ethylene terephthalate (PET) film, or polyimide (PI), or sapphire, but the embodiment is not limited thereto. In other words, the second substrate 130 may include various materials sufficient to perform the second sensing electrode 220 and the second wire.

Referring to FIG. 40, the second sensing electrode 220 may be provided on the second substrate 130. In detail, the second sensing electrode 220 may be provided in the active area of the second substrate 130. In other words, the second sensing electrode 220 may be provided in the first and second active areas 1AA and 2AA. The second sensing electrode 220 may sense the position of the input device. In detail, the second sensing electrode 220 may receive an electrical signal when the input device is touched.

The second sensing electrode 220 may extend in the second direction crossing the first direction. The second sensing electrode 220 includes the first and second sensing parts 221 and 222. The first sensing part 221 may be provided on the first active area 1AA. The second sensing part 222 may be provided on the second active area 2AA.

The first and second sensing parts 221 and 222 may include patterns corresponding to each other. In detail, the first and second sensing parts 221 and 222 may have the same pattern.

Referring to FIG. 40, although the second sensing electrode 220 is shown in the shape of a diamond, the embodiment is not limited thereto. Accordingly, the second sensing electrode 220 may have various shapes such as a polygonal shape including a triangular shape or a quadrangular shape, a circular shape, an oval shape, a linear shape or an H shape.

The second sensing electrode 220 may have the thickness in the range of 0.01 μm to 20 μm. The first and second sensing parts 221 and 222 may include mutually different materials. In detail, the first and second sensing parts 221 and 222 may materials having mutually different properties.

For example, the first sensing part 221 may include the first material. The first material may include a metallic oxide, such as indium tin oxide, indium zinc oxide, copper oxide, tin oxide, zinc oxide, or titanium oxide. The above first materials have advantages in visibility since the first materials do not interrupt light transmission. However, the first materials may be physically easily damaged as a substrate is bent or curved.

The second sensing part 222 may include the second material different from the first material. For example, the second material may include nano-wire, carbon nano-tube (CNT), graphene, or various metals. Especially, the second material may include a photosensitive nano-wire film formed by providing the nano-wires in a photosensitive film. In addition, the second sensing part 222, which includes the second material, may be provided in a mesh shape. The second materials have flexible properties for the curving and bending of the substrate. However, the second materials have disadvantages in visibility due to light reflection. The first sensing part 212 may include the second material, and the second sensing part 222 may include the first material.

In the first active area 1AA, the first sensing part 212 or the second sensing part 222 includes the first material, so that the visibility can be ensured above the first active area 1AA.

Figure 41:
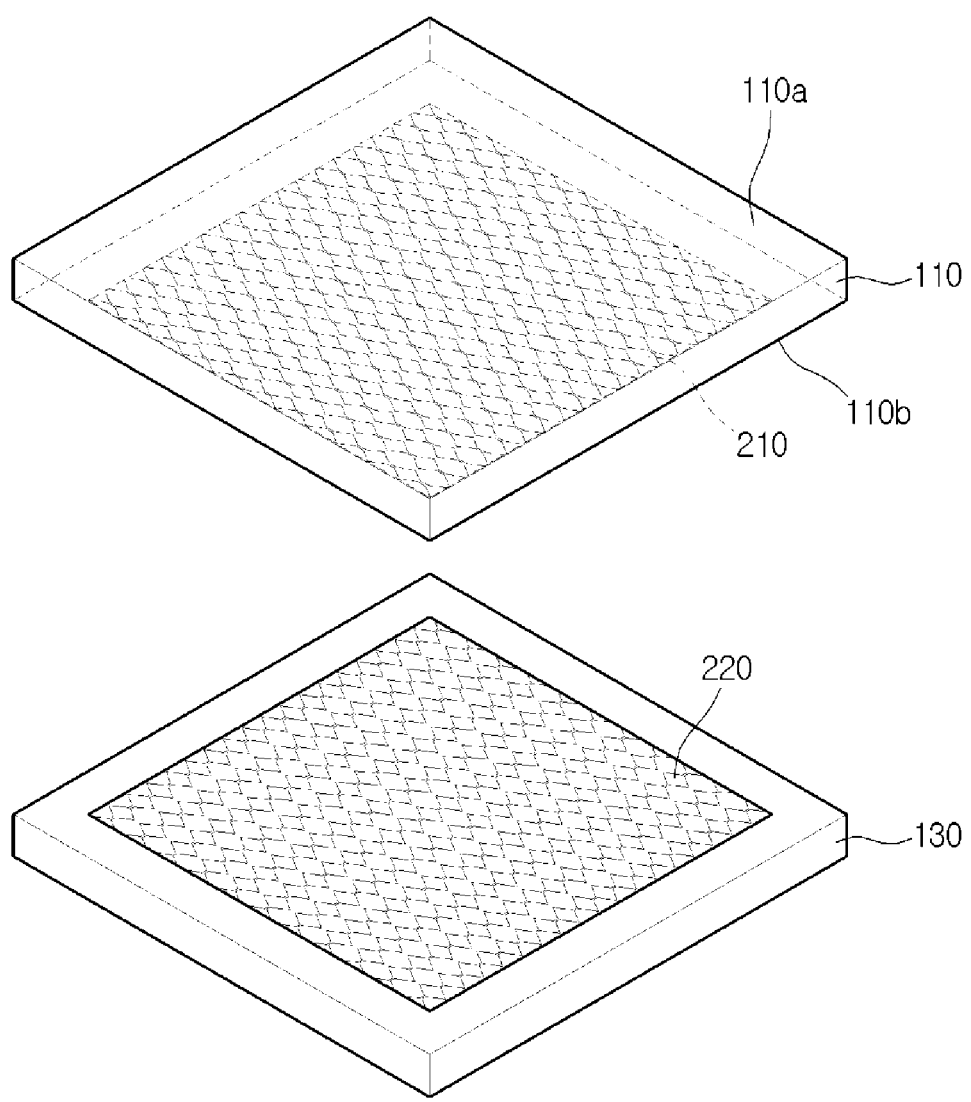
FIG. 41 is an exploded perspective view showing a touch window according to another embodiment.

Referring to FIG. 41, the touch window according to another embodiment may include the first sensing electrode 210 provided on the protective substrate 110 and the second sensing electrode 220 provided on the second substrate 130. In other words, the protective substrate 110 may include a top surface 110a and a bottom surface 110b, and the first sensing electrode 210 may be provided on the bottom surface 110b. In other words, the first sensing electrode 210 may be provided on a cover substrate to reduce the thickness of the touch window. In addition, touch window having various structures can be ensured.

An insulating layer may be further interposed between the protective substrate 110 and the second substrate 130 to prevent the first sensing electrode 210 from being electrically shorted with the second sensing electrode 220.

Figure 42:
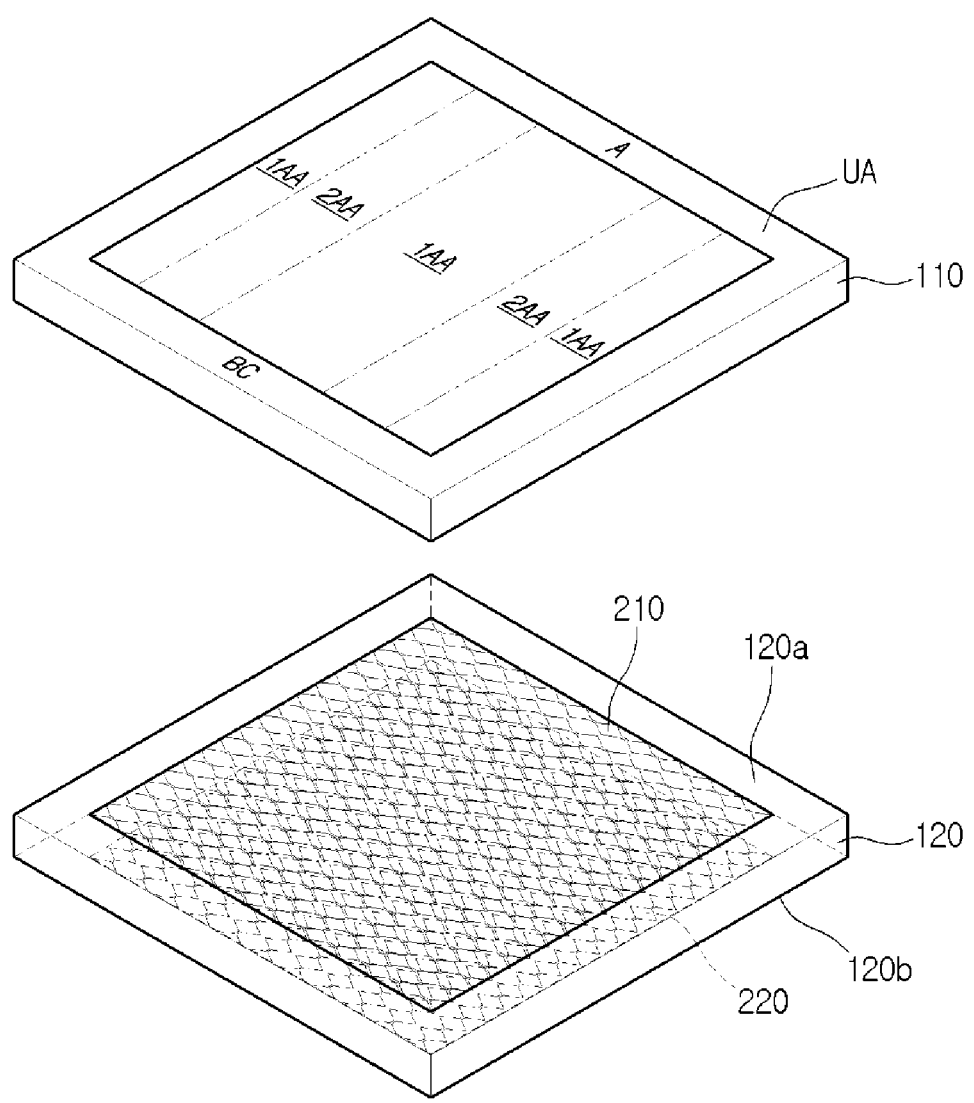
FIG. 42 is an exploded perspective view showing a touch window according to another embodiment.

Referring to FIG. 42, a touch window according to another embodiment may include the first and second sensing electrodes 210 and 220 provided on the same substrate.

In detail, the first and second sensing electrodes 210 and 220 may be provided on both surfaces of the same substrate. Accordingly, the first sensing electrode 210 may be provided on the top surface 120a of the first substrate 120, and the sensing electrode 220 may be provided on the bottom surface 120a of the first substrate 120. Accordingly, the thickness of the touch window can be reduced, and various structures can be ensured.

Figure 43:
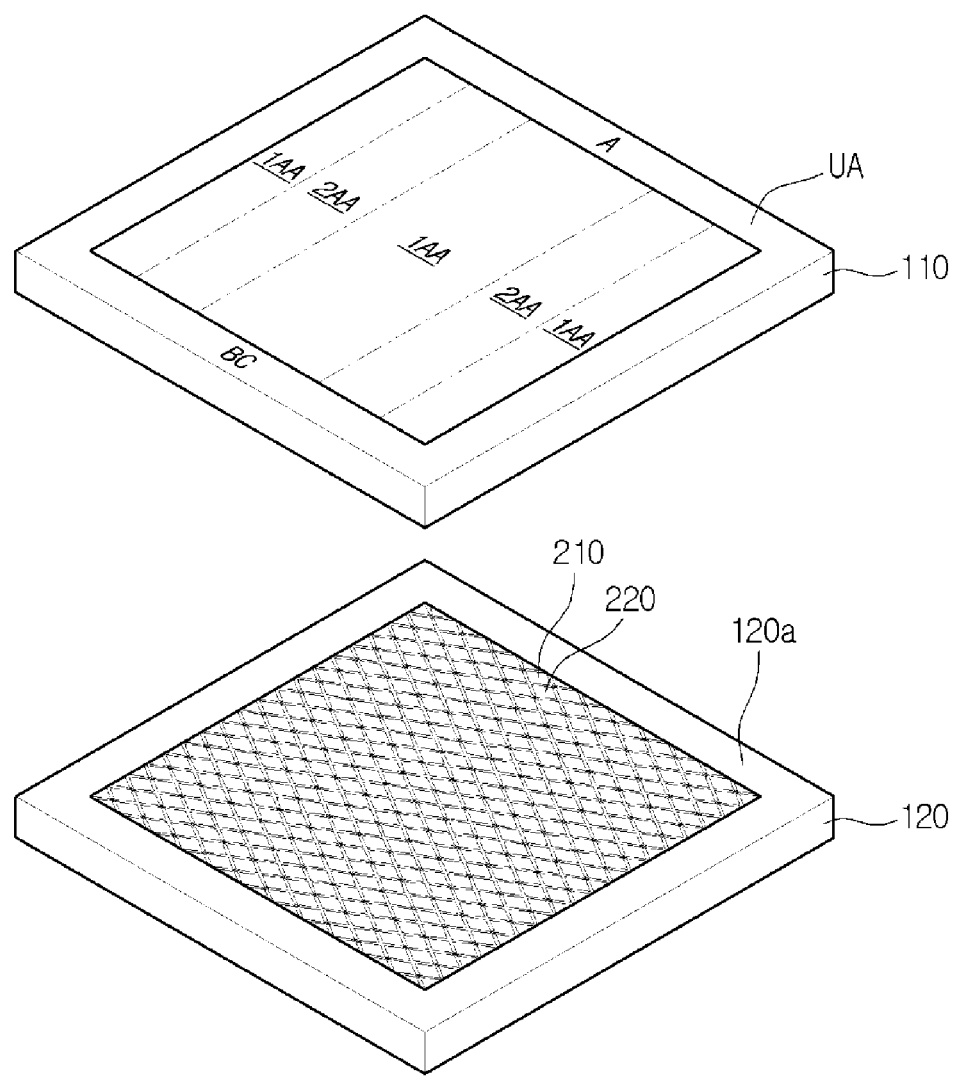
FIG. 43 is an exploded perspective view showing the touch window according to another embodiment.

Referring to FIG. 43, a touch window according to another embodiment may include the first and second sensing electrodes 210 and 220 provided on the same substrate. In detail, the first and second sensing electrodes 210 and 220 may be provided on one surface of the same substrate. Accordingly, both of the first and second sensing electrodes 210 and 220 may be provided on the top surface 120a of the first substrate 120. Accordingly, the thickness of the touch window can be reduced, and various structures can be ensured.

Figure 44:
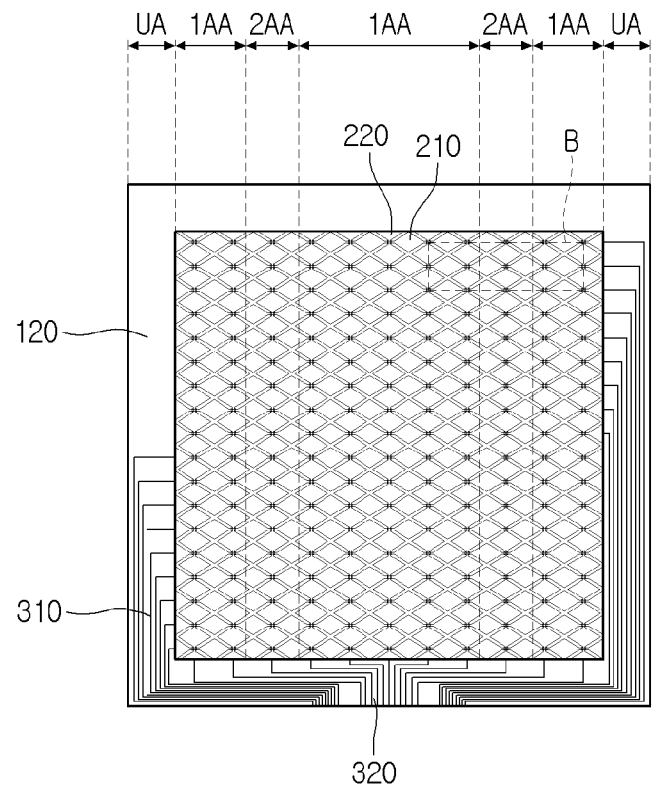
FIG. 44 is a plan view showing one surface of one substrate included in a touch window according to another embodiment.
Figure 45:
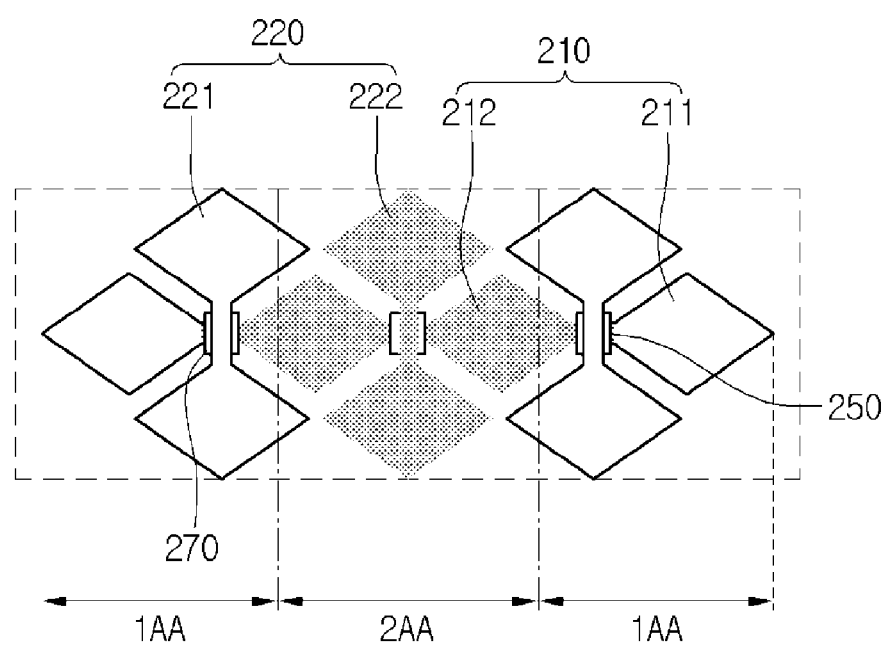
FIG. 45 is an enlarged view showing a part B of FIG. 44.

In detail, referring to FIGS. 44 and 45, an insulating part 270 may be further interposed between the first and second sensing electrodes 210 and 220. Accordingly, even if the first and second sensing electrodes 210 and 220 are provided on the same plane, the first and second sensing electrodes 210 and 220 can be prevented from being electrically shorted with each other.

Referring to FIG. 45, the connection electrode 250 is interposed between the third sensing part 211 and the fourth sensing part 212 of the first sensing electrode 210. The connection electrode 250 may extend from the fourth sensing part 212. The insulating part 270 may be provided on the connection electrode 250, and the second sensing electrode 220 may be provided across the insulating part 270.

Figure 46:
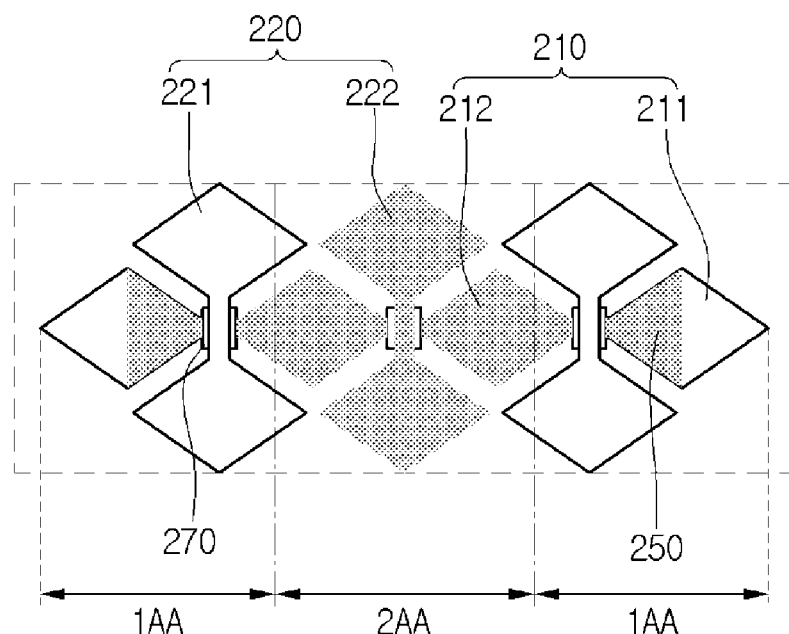
FIGS. 46 to 54 are enlarged views showing a touch window according to another embodiment.
Figure 47:
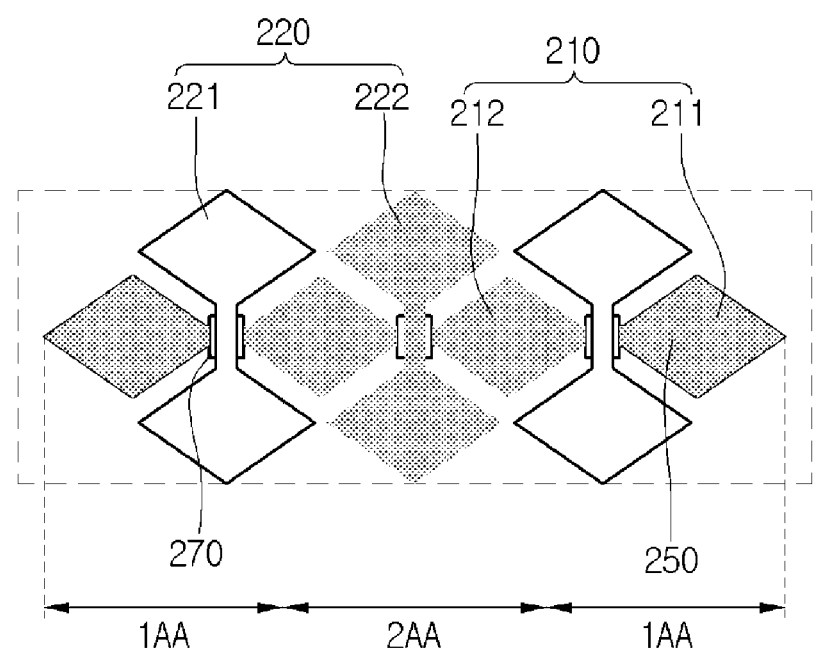
Figure 48:
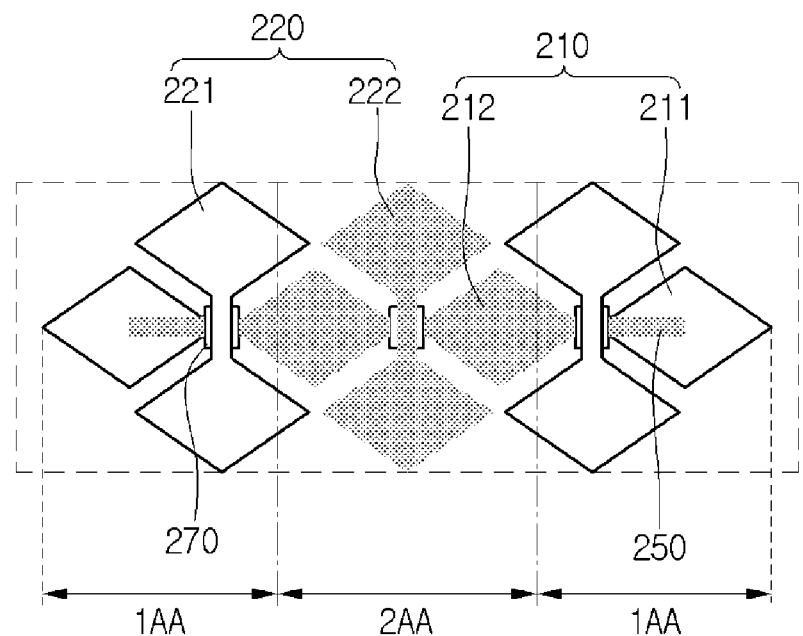

Referring to FIGS. 46 to 48, connection electrodes 250 are provided in mutually different shapes, insulating parts 270 are provided on the connection electrodes 250, respectively, and second sensing electrodes 220 may be provided across the insulating parts 270.

Figure 49:
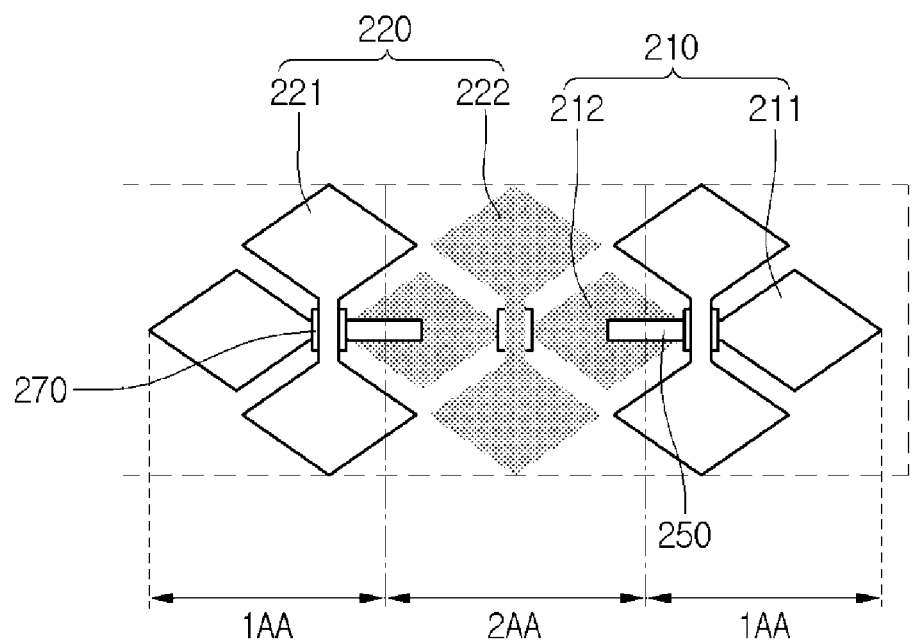
Figure 50:
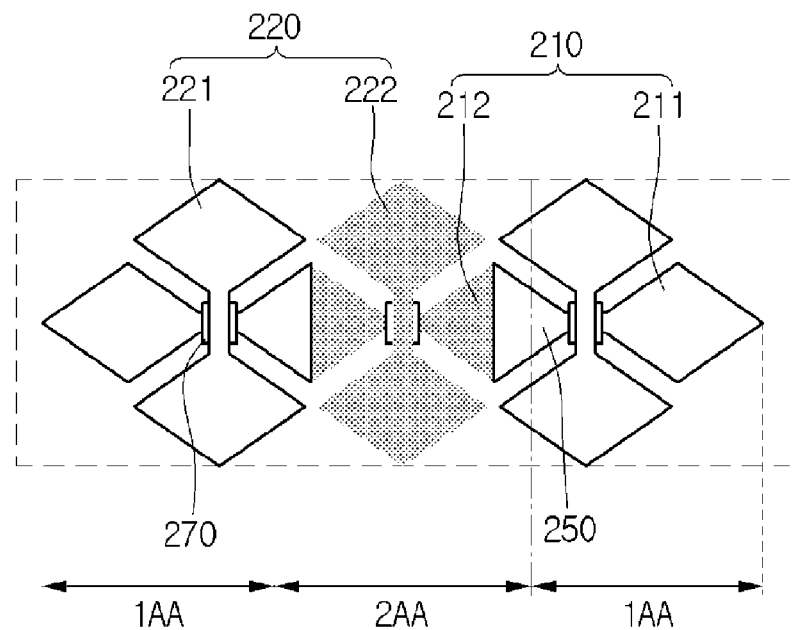

Referring to FIGS. 49 and 50, the connection electrode 250 extends from the third sensing part 211, and the insulating part 270 is provided on the connection electrode 250. The second sensing electrode 220 may be provided across the insulating part 270.

Figure 51:
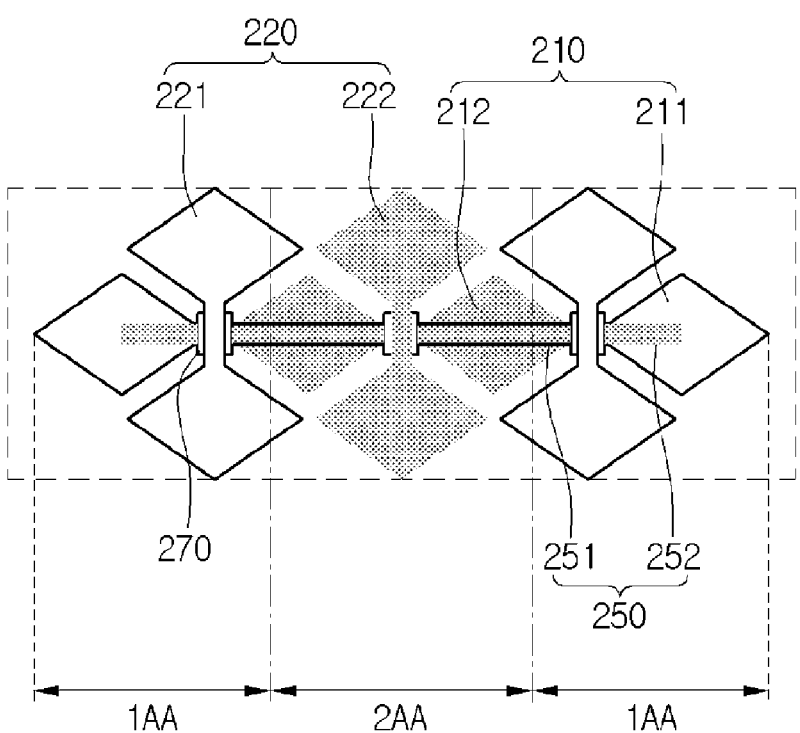
Figure 52:
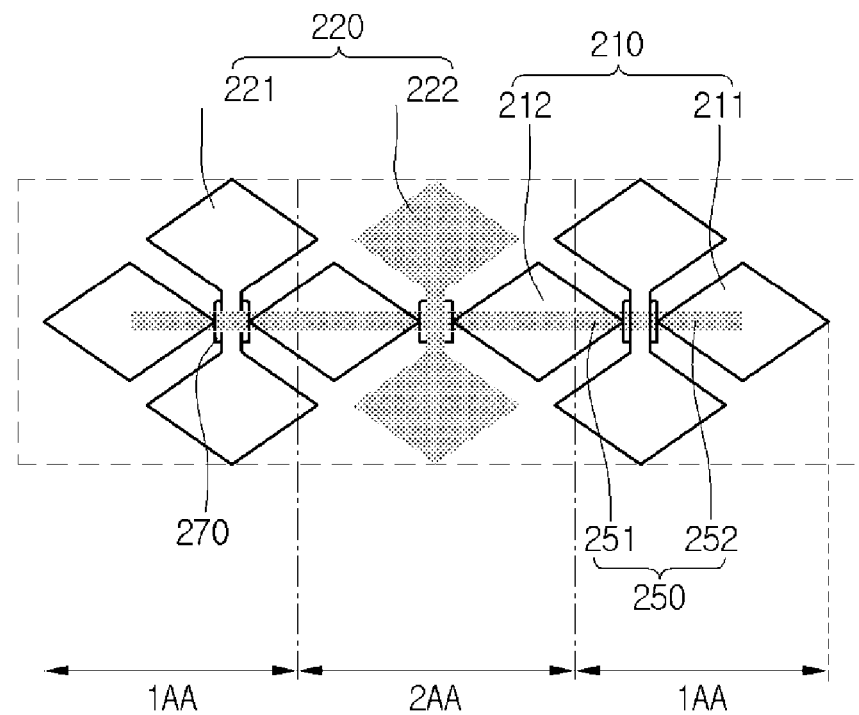
Figure 53:
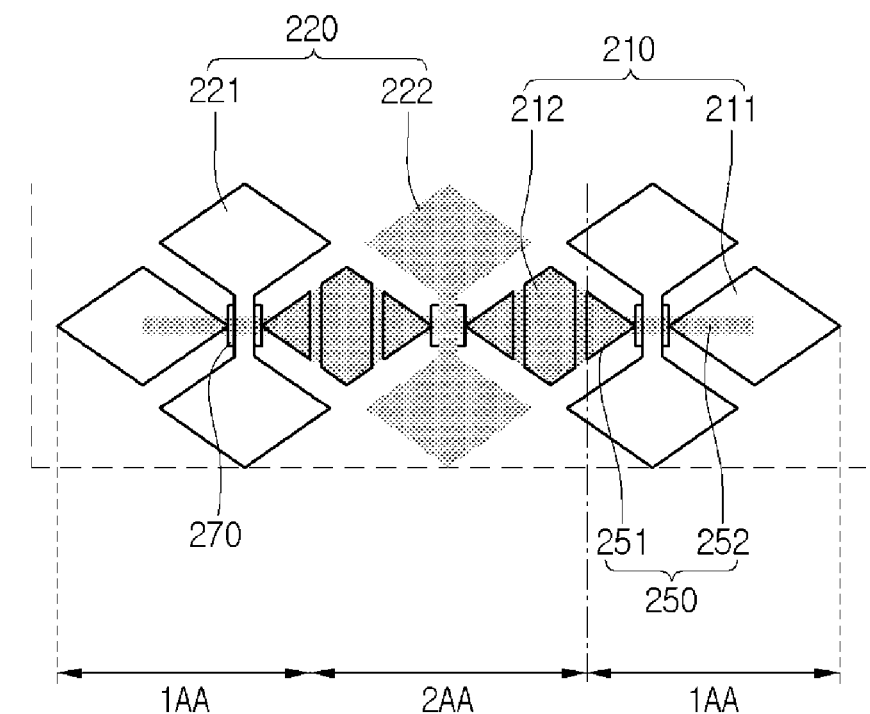

Referring to FIGS. 51 and 53, the connection electrode 250 may include first and second connection electrodes 251 and 252. An insulating part 270 is provided on the first connection electrode 251 and the second connection electrode 25; the second sensing electrode 220 may be provided across the insulating part 270.

Figure 54:
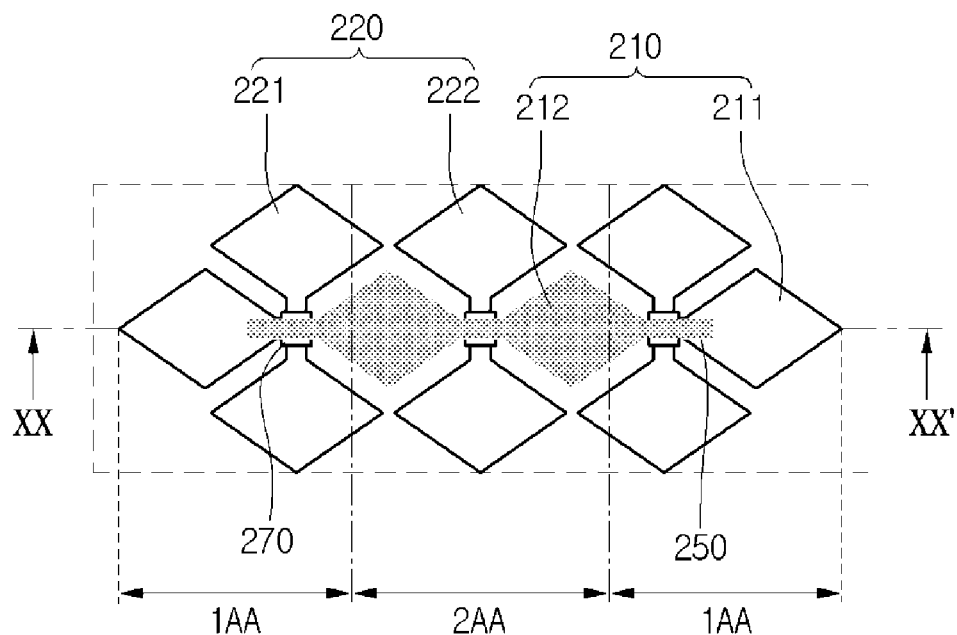
Figure 55:
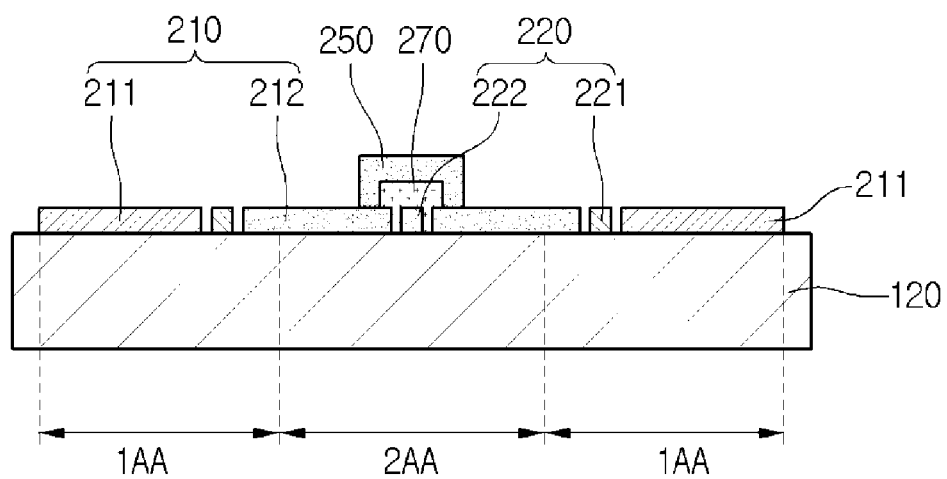
FIG. 55 is a sectional view taken along line XX-XX' of FIG. 54.

Referring to FIGS. 54 and 55, the first and second sensing electrodes 210 and 220 are provided on the substrate 120. The first and second sensing electrodes 210 and 220 may directly make contact with the substrate 120. In this case, the connection electrode 250 may be electrically connected with the first sensing electrode 210. The insulating part 270 is interposed between the second sensing electrode 220 and the connection electrode 250. In this case, the connection electrode 250 may be provided at the uppermost portion of the substrate 120. Therefore, after forming the first and second sensing electrodes, the connection electrode 250 may be formed.

Figure 56:
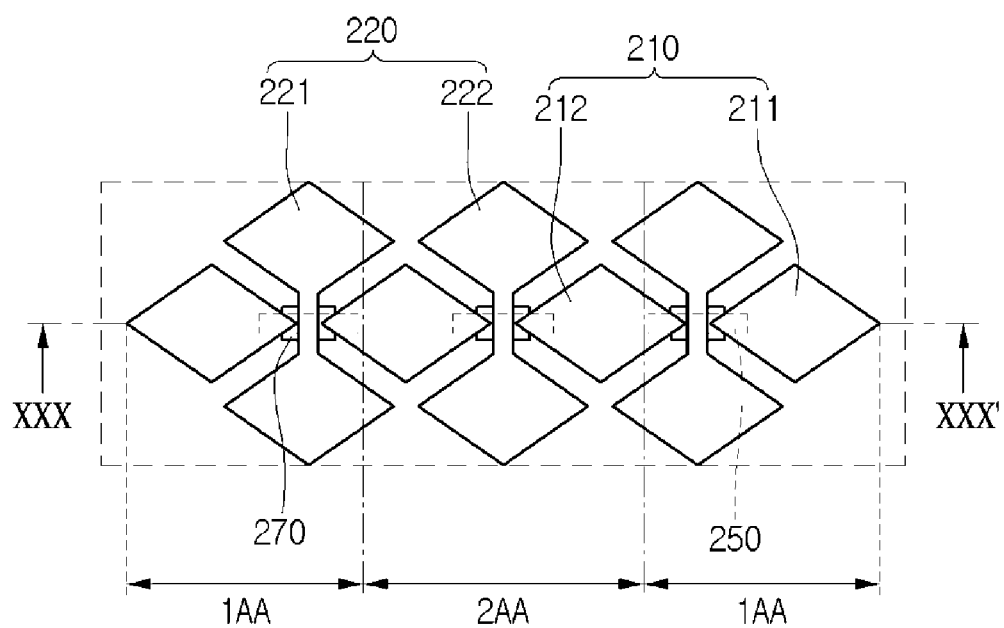
FIG. 56 is an enlarged view showing a touch window according to another embodiment.
Figure 57:
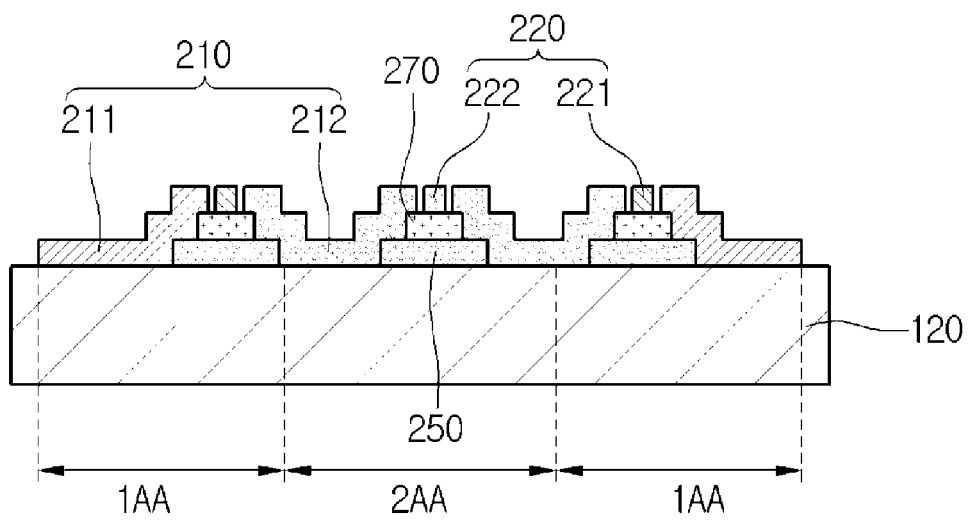
FIG. 57 is a sectional view taken along line XXX-XXX' of FIG. 56.

Referring to FIGS. 56 and 57, the connection electrode 250 may be provided at the lowermost portion of the substrate 120. Accordingly, after forming the connection electrode 250, the insulating part 270, the second sensing electrode 220, and the first sensing electrode 210 may be formed.

Figure 58:
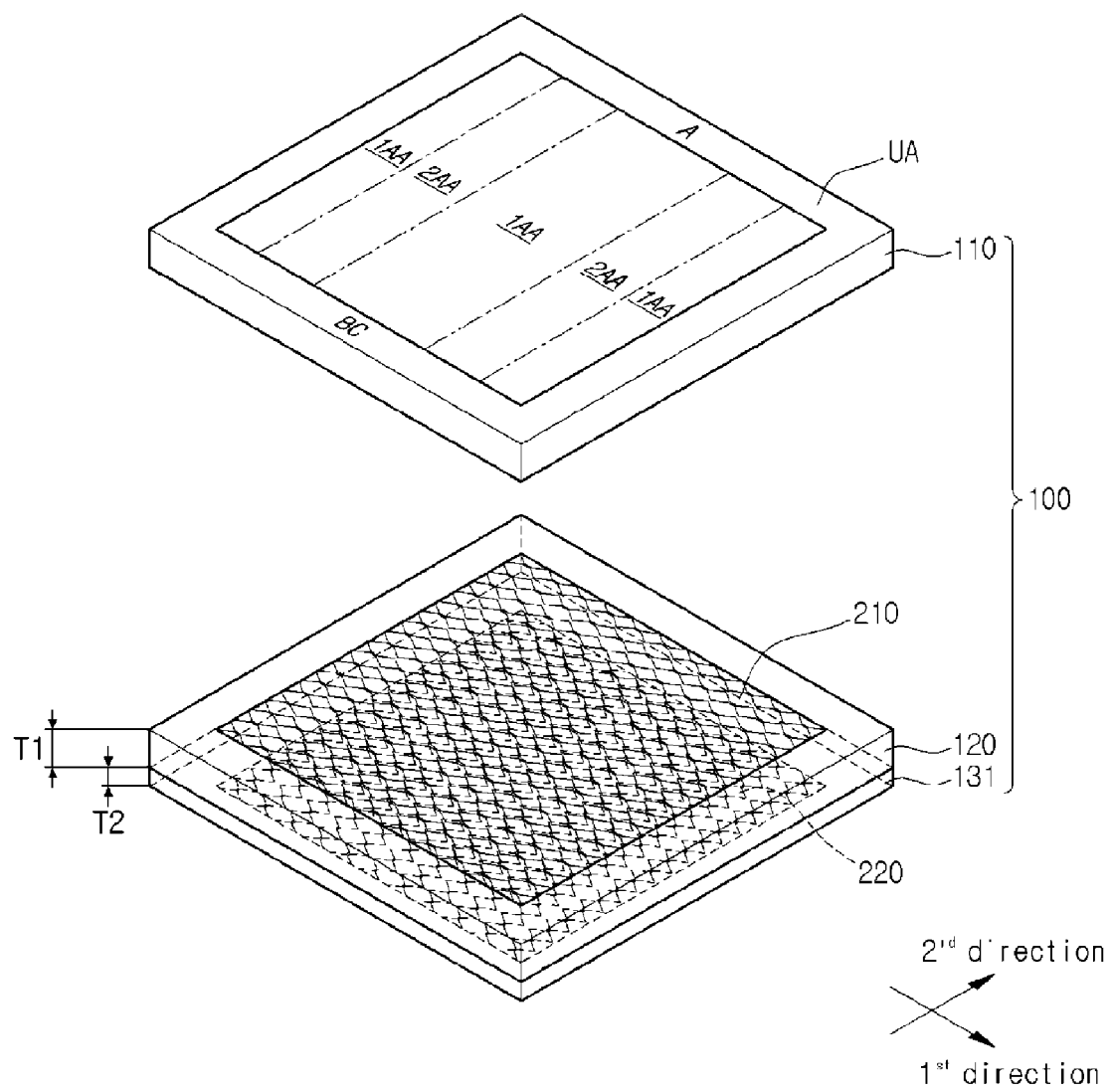
FIG. 58 is an exploded perspective view showing a touch window according to another embodiment.

Referring to FIG. 58, a touch window according to another embodiment includes the first substrate 120, the first sensing electrode 210 on the first substrate 120, a dielectric layer 131 provided on a bottom surface of the first substrate 120, and the second sensing electrode 220 provided on the dielectric layer 131.

In this case, the thickness T2 of the dielectric layer 131 may be less than the thickness T1. In detail, the thickness T2 of the dielectric layer 131 may be in the range of 0.05 times to 0.5 times thicker than the thickness T1 of the first substrate 120. For example, the thickness T1 of the first substrate 120 may be 0.05 nm, and the thickness T2 of the dielectric layer 131 may be 0.005 nm.

The dielectric layer 131 may be directly formed on the bottom surface of the first substrate 120. In other words, the dielectric layer 131 may be formed by directly coating a dielectric material on the bottom surface of the first substrate 120. Thereafter, the second sensing electrode 220 may be formed on the dielectric layer 131.

The thickness of the touch window can be thinly ensured due to the dielectric layer 131, so that light transmittance can be improved. The cracks of the first sensing electrode 210 or the second sensing electrode 220 can be prevented. Accordingly, the bending characteristic and the reliability of the touch window can be improved.

Figure 59:
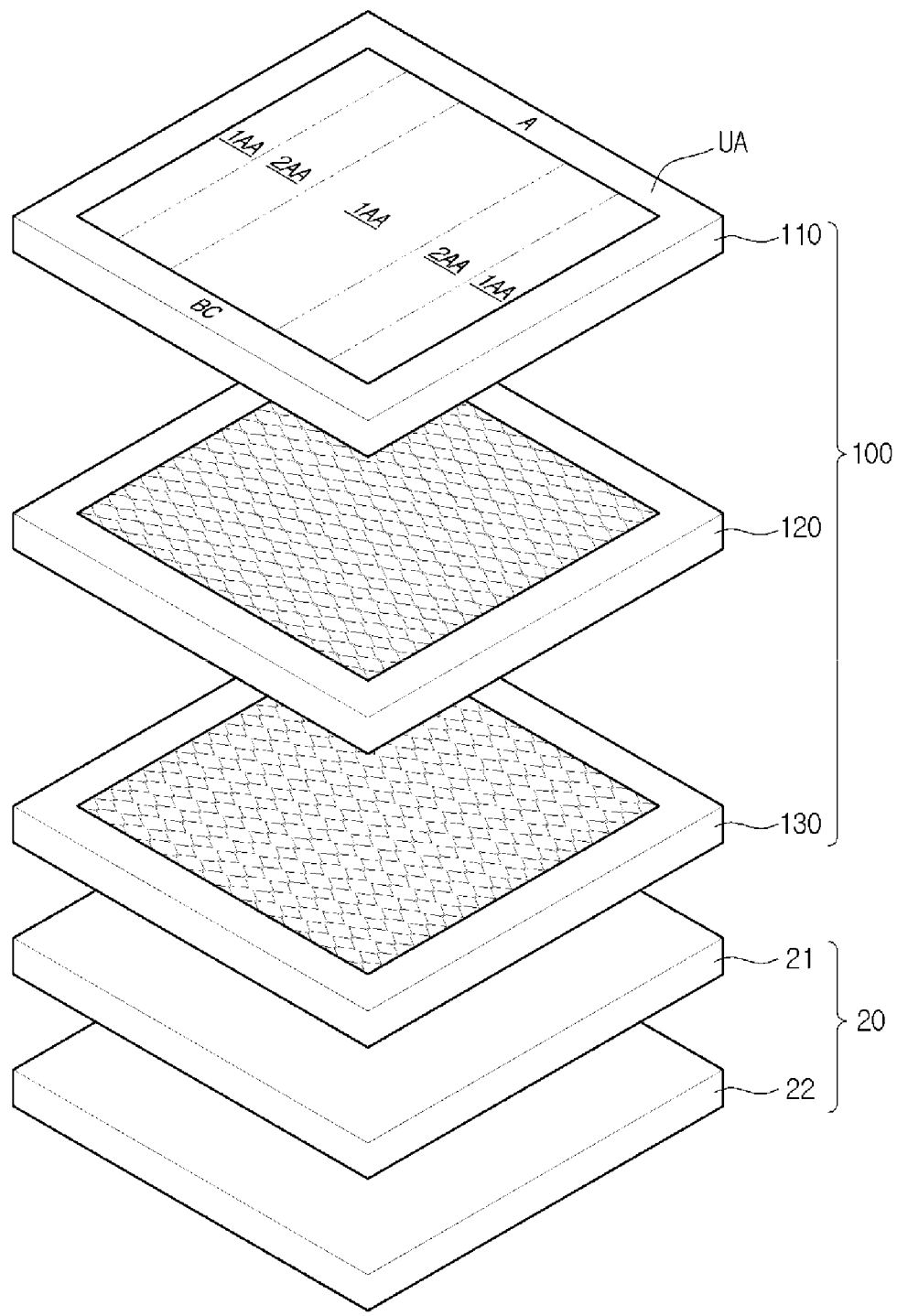
FIG. 59 is a sectional view showing a display device in which a touch window according to the embodiment is provided on a driving part.

Referring to FIG. 59, the touch window 10 may be provided on a driving part 20. The touch window 10 and the driving part 20 are bonded to each other to constitute a device. The driving part 20 may include a light module and a display panel. The display panel may include a liquid crystal display (LCD), a field emission display, a plasma display panel (PDP), an organic light emitting display (OLED), and an electrophoretic display (EPD). Accordingly, various types of display panels can be configured.

The light module may include a light source to output light in a direction of the display panel. For example, the light source may include a light emitting diode (LED) or an organic light emitting diode (OLED). The LCD may include a plurality of liquid crystal devices. The liquid crystal device may have an orientation at a predetermined pattern as the arrangement of internal molecules is changed according to an electrical signal applied to the LCD from an outside.

The driving part allows lights output from the light module to pass through the display panel so that the lights can be refracted at mutually different patterns. Although not shown in drawings, the driving part may further include a polarization filter and a color filter arranged on the display panel. The driving part may include only the light module without the display panel. For example, the driving part may include only the light module including a light source individually driven with respect to each pixel. The driving part may include only the display panel without the light module. For example, the display panel may include the light module embedded therein in the field emission display, the PDP, the OLED, and the EPD.

The touch window may be provided on the driving part. In detail, the touch window may be received in a cover case and provided on the driving part. The touch window may be bonded to the driving part. In detail, the touch panel and the driving part may be bonded to each other through an optical clear adhesive (OCA). However, the embodiment is not limited thereto. The touch window may have an on-cell structure in which an electrode is directly formed on the driving part without the adhesive, or an in-cell structure in which the touch window is provided in the driving part.

Figure 60:
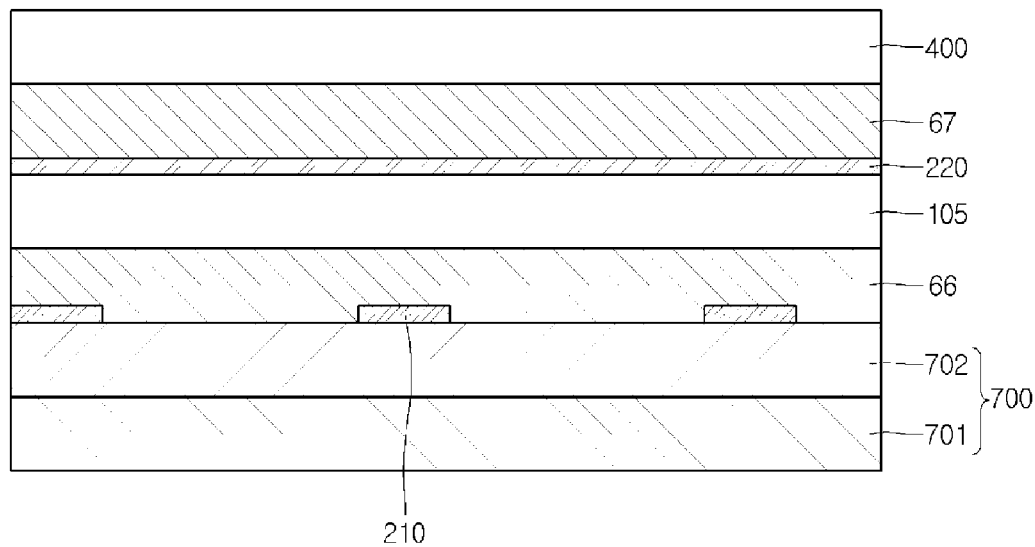
FIGS. 60 and 61 are views to explain a touch window according to another embodiment.
Figure 61:
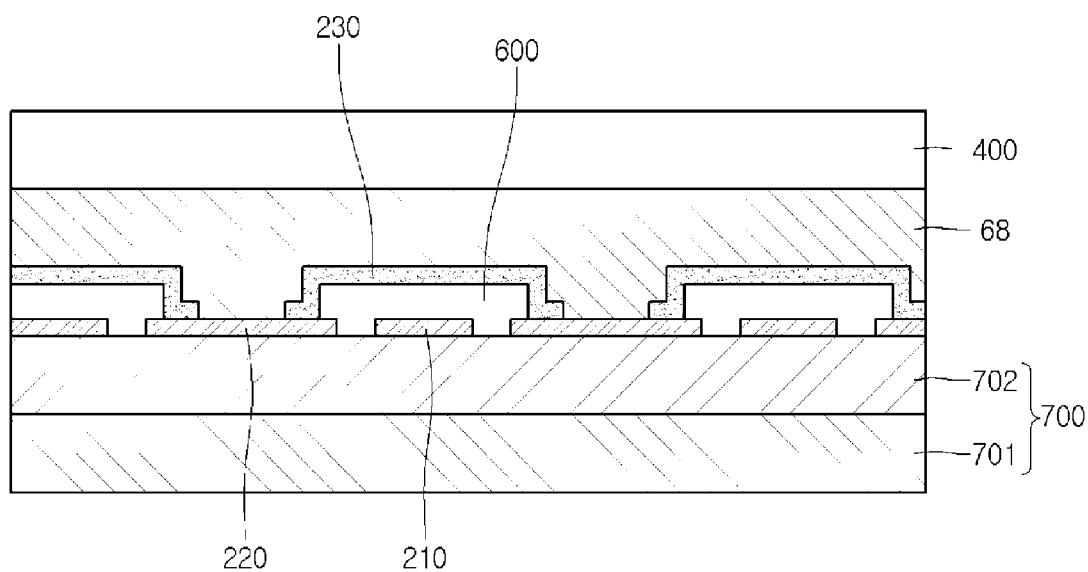

A touch device according to another embodiment will be described with reference to FIGS. 60 and 61. FIGS. 60 and 61 are sectional views to explain the touch device according to another embodiment. The details of structures and components the same as or similar to those described above will be omitted below. The same reference numbers will be assigned to the same elements.

Referring to FIGS. 60 and 61, the touch device according to another embodiment may be formed integrally with a display panel 700. In other words, a substrate to support at least one sensing electrode may be omitted.

In detail, at least one sensing electrode may be formed on at least one surface of the display panel 700. The display panel 700 includes first and second substrates 701 and 702. In other words, at least one sensing electrode may be formed on at least one surface of the first substrate 701 or the second substrate 702.

If the display panel 700 is a liquid crystal display panel, the display panel 700 may have a structure in which the first substrate 701 including a thin film transistor and a pixel electrode is bonded to the second substrate 702 including color filter layers while interposing a liquid crystal layer therebetween.

In addition, the display panel 700 may be a liquid crystal display panel having a color filter on transistor (COT) structure in which a thin film transistor, a color filter, and a black matrix are formed on the first substrate 701, and the second substrate 702 is bonded to the first substrate 701 while a liquid crystal layer is being interposed between the second substrate 702 and the first substrate 701. In other words, a thin film transistor may be formed on the first substrate 701, the protective layer may be formed on the thin film transistor, and a color filter layer may be formed on the protective layer. In addition, a pixel electrode is formed on the substrate 701 while making contact with the thin film transistor. In this case, the black matrix may be omitted, and the common electrode may perform the function of the black matrix in order to improve an aperture ratio and simplify a mask process.

In addition, if the display panel 700 is a liquid crystal display panel, the display device may further include a backlight unit to supply light from a rear surface of the display panel 700.

If the display panel 700 is an organic electroluminescence panel, the display panel 700 includes a self-emissive device that does not require an additional light source. The display panel 700 includes a thin film transistor formed on the first substrate 701 and an organic light emitting device making contact with the thin film transistor. The organic light emitting device may include an anode, a cathode, and an organic light emitting layer formed between the anode and the cathode. In addition, the second substrate 702 serving as an encapsulation substrate for encapsulation may be further formed on the organic light emitting device.

In this case, at least one sensing electrode may be formed on the top surface of an upper substrate. Although drawings show that the sensing electrode is formed on the top surface of the second substrate 702, if the first substrate 701 is the upper substrate, at least one sensing electrode may be formed on the top surface of the first substrate 701.

Referring to FIG. 60, the first sensing electrode 210 may be formed on the top surface of the display panel 700. In addition, a first wire connected with the first sensing electrode 210 may be formed. A touch substrate 105 including the second sensing electrode and the second wire may be formed on the display panel 700 including the first sensing electrode 210. A first adhesive layer 66 may be interposed between the touch substrate 105 and the display panel 700.

Although FIG. 60 shows that the second sensing electrode 220 is formed on the top surface of the touch substrate 105, and a cover substrate 400 is provided above the touch substrate 105 while the second adhesive layer 67 is interposed between the touch substrate 105 and the cover substrate 400, the embodiment is not limited thereto. The second sensing electrode 220 may be formed on the rear surface of the touch substrate 105. In this case, the touch substrate 105 may serve as the cover substrate.

In other words, the embodiment is not limited to the structure shown in FIG. 60, and various structures may be employed if the first sensing electrode 210 is formed on the top surface of the display panel 700, the touch substrate 105 to support the sensing electrode 220 is provided on the display panel 700, and the touch substrate 105 is bonded to the display panel 700.

In addition, the touch substrate 105 may include a polarizing plate. In other words, the second electrode 220 may be formed on the top surface or the rear surface of the polarizing plate. Accordingly, the second electrode may be integrally formed with the polarizing plate.

In addition, the polarizing plate may be provided separately from the touch substrate 105. In this case, the polarizing plate may be provided under the touch substrate 105. For example, the polarizing plate may be interposed between the touch substrate 105 and the display panel 700. In addition, the polarizing plate may be provided above the touch substrate 105.

The polarizing plate may be a line polarizing plate or an anti-reflective polarizing plate. For example, if the display panel 700 is a liquid crystal display panel, the polarizing plate may be the line polarizing plate. In addition, if the display panel 700 is an organic electroluminescence panel, the polarizing plate may be the anti-reflective polarizing plate.

Referring to FIG. 61, the first and second sensing electrode 210 and 220 may be formed on the top surface of the display panel 700. In addition, a first wire connected with the first sensing electrode 210 and a second wire connected to the second sensing electrode 220 may be formed on the top surface of the display panel 700.

In addition, an insulating layer 600 may be formed on the first sensing electrode 210 and expose the second sensing electrode 220. A bridge electrode 230 may be further formed on the insulating layer 600 for the connection of the sensing electrode 220.

However, the embodiment is not limited to the structure shown in FIG. 61, the first sensing electrode 210, and the first and second wires may be formed on the top surface of the display panel 700, and an insulating layer may be formed on the first sensing electrode 210 and the first wire. The second sensing electrode 220 may be formed on the insulating layer, and a connection part may be further provided to connect the second sensing electrode 220 with the second wire.

In addition, the first sensing electrode 210, the second sensing electrode 220, and the first and second wires may be formed in the active area of a top surface of the display panel 700. The first sensing electrode 210 may be spaced apart from the second sensing electrode 220 or provided adjacent to the second sensing electrode 220. In other words, the insulating layer, or the bridge electrode may be omitted.

In other words, the embodiment is not limited to the structure shown in FIG. 61, but various structures may be employed if the first and second sensing electrodes 210 and 220 are formed on the display panel 700 without an additional substrate to support the sensing electrodes.

The cover substrate 400 may be provided on the display panel 700 while the adhesive layer 68 is interposed between the cover substrate 400 and the display panel 700. In this case, a polarizing plate may be interposed between the display panel 700 and the cover substrate 400.

Hereinafter, a touch device (in-cell structure) according to another embodiment will be described with reference to FIGS. 62 to 65.

FIGS. 62 to 65 are sectional views to explain a touch device according to another embodiment. The details of structures and components the same as or similar to those of the previous embodiments described above will be omitted below. The same reference numerals will be assigned to the same elements.

Referring to FIGS. 62 to 65, a touch device according to another embodiment may include a touch window formed integrally with a display panel. In other words, a substrate to support at least one sensing electrode may be omitted, or all substrates to support sensing electrodes may be omitted.

A sensing electrode provided in the active area to sense the touch and a wire to apply an electrical signal to the sensing electrode may be formed inside the display panel. In detail, at least one sensing electrode or at least one wire may be formed inside the display panel.

The display panel includes the first and second substrates 701 and 702. In this case, at least one of the first and second sensing electrodes 210 and 220 is interposed between the first and second substrates 701 and 702. In other words, at least one sensing electrode may be formed on at least one surface of the first substrate 701 or the second substrate 702.

Figure 62:
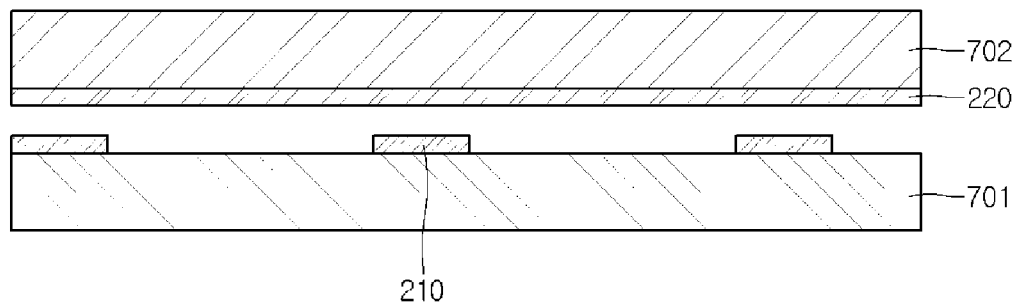
FIGS. 62 to 65 are sectional views showing a touch window according to another embodiment.
Figure 63:
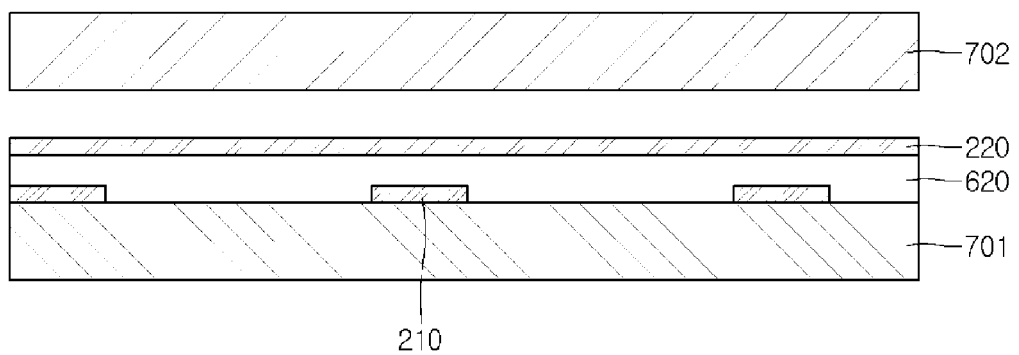
Figure 64:
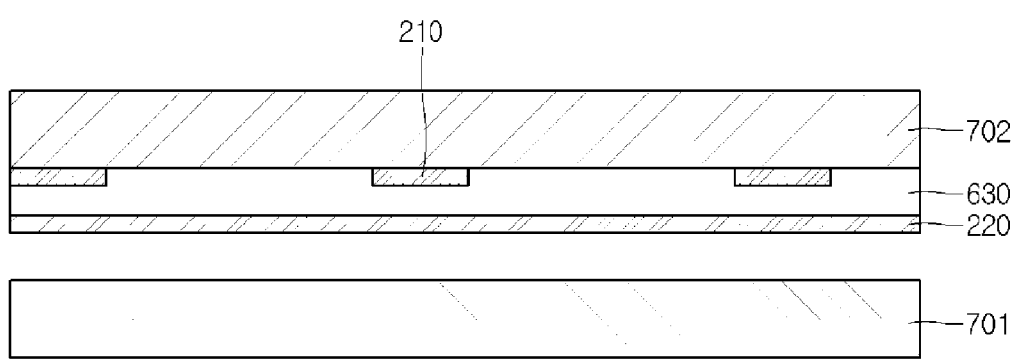

Referring to FIGS. 62 to 64, the first sensing electrode 210, the second sensing electrode 220, and the first and second wires may be interposed between the first substrate 701 and the second substrate 702. In other words, the first sensing electrode 210, the second sensing electrode, and the first and second wires may be provided inside the display panel.

Referring to FIG. 62, the first sensing electrode 210 and the first wire are formed on the top surface of the first substrate 701 of the display panel, and the second sensing electrode 220 and the second wire may be formed on the rear surface of the second substrate 702. Referring to FIG. 63, the first sensing electrode 210, the second sensing electrode 220, and the first and second wires may be formed on the top surface of the first substrate 701. An insulating layer 620 may be interposed between the first and second sensing electrodes 210 and 220. Referring to FIG. 64, the first and second sensing electrodes 210 and 220 may be formed on the rear surface of the second substrate 702. An insulating layer 630 may be interposed between the first and second sensing electrodes 210 and 220.

Figure 65:
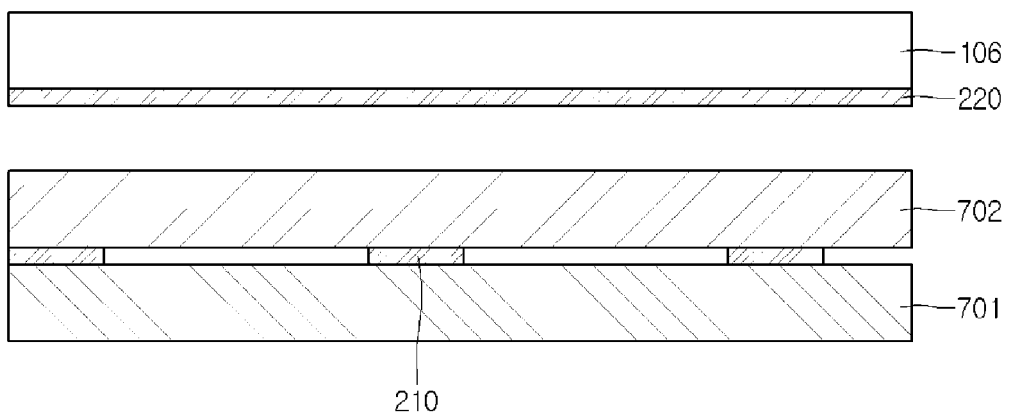

Referring to FIG. 65, the first sensing electrode 210 and the first wire may be interposed between the first and second substrates 701 and 702. In addition, the second sensing electrode 220 and the second wire may be formed on the touch substrate 106. The touch substrate 106 including the first and second substrates 701 and 702 may be provided on the display panel. In other words, the first sensing electrode 210 and the first wire are provided inside the display panel, and the second sensing electrode 220 and the second wire may be provided outside the display panel.

The first sensing electrode 210 and the first wire may be formed on the top surface of the first substrate 701 or the rear surface of the second substrate 702. In addition, an adhesive layer may be interposed between the touch substrate 106 and the display panel. In this case, the touch substrate 105 may serve as the cover substrate.

Although FIG. 65 shows the structure that the second sensing electrode 220 is formed on the rear surface of the touch substrate 106, the embodiment is not limited thereto. The second sensing electrode 220 may be formed on the top surface of the touch substrate 106, and a cover substrate may be further interposed between the touch substrate 106 and the adhesive layer.

In other words, the embodiment is not limited to the structure shown in FIG. 65, but the first sensing electrode 210 and the first wire are provided inside the display panel, and the second sensing electrode 220 and the second wire are provided outside the display panel.

In addition, the touch substrate 106 may be a polarizing plate. In other words, the second sensing electrode 220 may be formed on the top surface or the rear surface of the polarizing plate. Accordingly, the second sensing electrode may be formed integrally with the polarizing plate.

In addition, the polarizing plate may be further provided separately from the touch substrate 106. In this case, the polarizing plate may be provided under the touch substrate 106. For example, the polarizing plate may be interposed between the touch substrate 106 and the display panel. In addition, the polarizing plate may be provided at an upper portion of the touch substrate 106.

If the display panel is a liquid crystal display panel, and if the sensing electrode is formed on the top surface of the first substrate 701, the sensing electrode may be formed together with a thin film transistor (TFT) or a pixel electrode. In addition, if the sensing electrode is formed on the rear surface of the second substrate 702, a color filter layer may be formed on the sensing electrode, or the sensing electrode may be formed on the color filter layer. If the display panel is an organic electroluminescence panel, and if the sensing electrode is formed on the top surface of the first substrate 701, the sensing electrode may be formed together with the thin film transistor or the organic light emitting device.

The embodiment provides a touch window having improved reliability and a display including the same.

In addition, the embodiment provides a touch window, which is a flexible, and a display including the same.

Further, the embodiment provides a touch window having improved reliability and a display including the same.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
   a substrate having first and second active areas;
   a first sensing electrode provided on the first active area to sense a position; and
   a second sensing electrode provided in the second active area to sense a position,
   wherein the first sensing electrode comprises a material different from a material constituting the second sensing electrode,
   wherein the first active area is planar and larger than the second active area, and the second active area is bent and provided at at least one lateral side of the first active area, and
   wherein the second sensing electrode is bent from a lateral side of the first sensing electrode, and the material of the first sensing electrode includes a metallic oxide and has a higher light transmittance than the material of the second sensing electrode, the material of the second sensing electrode having greater flexibility than the first sensing electrode and having nano-wire, carbon nanotube (CNT), graphene, or metal.

2. The touch window of claim 1, wherein the substrate further includes a boundary part between the first and second active areas, wherein at least one of the first and second sensing electrodes is provided in the boundary part.

3. The touch window of claim 2, wherein the boundary part includes a patterned electrode.

4. The touch window of claim 3, wherein the patterned electrode exposes a top surface of the substrate.

5. The touch window of claim 2, wherein the second sensing electrode includes first and second sensing parts.

6. The touch window of claim 5, wherein the second sensing part is provided in the boundary part and includes a pattern to expose a top surface of the substrate.

7. The touch window of claim 6, wherein a connection electrode extends from the second sensing electrode.

8. The touch window of claim 6, wherein a second connection electrode extends from the first sensing electrode.

9. The touch window of claim 6, further comprising a connection electrode to connect the first sensing electrode with the second sensing electrode, the connection electrode including:
   a first connection electrode having a first material; and
   a second connection electrode having a second material.

10. The touch window of claim 5, wherein the second sensing part is provided in the boundary part, and an electrode density of the second sensing part is less than an electrode density of the first sensing part.

11. The touch window of claim 5, wherein the second sensing part is provided in the boundary part and includes a plurality of holes.

12. The touch window of claim 5, wherein the second sensing part is provided in the boundary part and includes a nano-wire, and a density of the nano-wire is reduced toward the first active area.

13. The touch window of claim 1, wherein the first sensing electrode includes a third sensing part provided in the first active area and a fourth sensing part provided in a boundary part.

14. The touch window of claim 13, wherein the fourth sensing part includes a pattern to expose a top surface of the substrate.

15. The touch window of claim 1, wherein the second sensing electrode includes a base having an electrode.

16. The touch window of claim 15, wherein the base includes a photosensitive material, and the electrode includes a nano-wire.

17. The touch window of claim 1, wherein the first sensing electrode is provided on a top surface thereof with a fine protrusion.

18. The touch window of claim 1, further comprising a connection electrode to connect the first sensing electrode with the second sensing electrode.

19. The touch window of claim 1, wherein two second active areas are provided at opposite lateral sides of the first active area.

20. A touch window comprising:
   a substrate in which first and second active areas are defined;
   a first sensing electrode provided on the first active area to sense a position;
   a second sensing electrode provided in the second active area to sense a position;
   a boundary part between the first and second active areas; and
   a connection electrode to connect the first sensing electrode with the second sensing electrode, wherein at least one of the first and second sensing electrodes is provided in the boundary part,
   wherein the first sensing electrode includes a material different from a material constituting the second sensing electrode,
   wherein the second sensing electrode includes first and second sensing parts, the second sensing part provided in the boundary part and having a pattern to expose a top surface of the substrate,
   wherein the connection electrode includes:
     a first connection electrode having a first material; and
     a second connection electrode having a second material,
     wherein the second connection electrode extends from the second sensing electrode and is provided on the first sensing electrode, and the first connection electrode is provided on the second sensing electrode.

21. A touch window comprising:
   a substrate having first and second active areas;
   a first sensing electrode provided on the first active area to sense a position;
   a second sensing electrode provided in the second active area to sense a position; and
   a connection electrode to connect the first sensing electrode with the second sensing electrode,
   wherein the first sensing electrode includes a material different from a material constituting the second sensing electrode, and
   wherein the connection electrode includes a first connection electrode having a first material and a second connection electrode having a second material, the second connection electrode extending from the second sensing electrode and provided on the first sensing electrode, and the first connection electrode provided on the second sensing electrode.

* * * * *